United States Patent
Ciesla et al.

(10) Patent No.: US 9,612,659 B2
(45) Date of Patent: Apr. 4, 2017

(54) USER INTERFACE SYSTEM

(71) Applicant: Tactus Technology, Inc., Fremont, CA (US)

(72) Inventors: Craig Ciesla, Fremont, CA (US); Micah Yairi, Fremont, CA (US)

(73) Assignee: Tactus Technology, Inc., Hayward, CA (US)

( * ) Notice: Subject to any disclaimer, the term of this patent is extended or adjusted under 35 U.S.C. 154(b) by 134 days.

(21) Appl. No.: 14/486,743

(22) Filed: Sep. 15, 2014

(65) Prior Publication Data

US 2015/0029123 A1 Jan. 29, 2015

Related U.S. Application Data

(63) Continuation-in-part of application No. 13/481,676, filed on May 25, 2012, now Pat. No. 8,922,510.
(Continued)

(51) Int. Cl.
*G06F 3/01* (2006.01)
*G06F 3/041* (2006.01)
(Continued)

(52) U.S. Cl.
CPC ........... *G06F 3/016* (2013.01); *G06F 3/0202* (2013.01); *G06F 3/041* (2013.01);
(Continued)

(58) Field of Classification Search
CPC ....... G06F 2203/04809; G06F 3/04895; G06F 3/016; G06F 3/044; G06F 3/04883;
(Continued)

(56) References Cited

U.S. PATENT DOCUMENTS 3,034,628 A   5/1962 Wadey
3,659,354 A   5/1972 Sutherland
(Continued)

FOREIGN PATENT DOCUMENTS

CN   1260525 A   7/2000
CN   1530818 A   9/2004
(Continued)

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.
(Continued)

*Primary Examiner* — Patrick F Marinelli
(74) *Attorney, Agent, or Firm* — Jeffrey Schox; Padowithz Alce

(57) ABSTRACT

A user interface system of one embodiment includes a layer defining a surface; a substrate supporting the layer and at least partially defining a cavity; a displacement coupled to the cavity that expands the cavity, thereby deforming a particular region of the surface; and a touch sensor coupled to the substrate and adapted to sense a user touch proximate the particular region of the surface. The layer and the substrate are connected at an attachment point, and the location of the attachment point relative to the layer, substrate, and cavity at least partially defines the shape of the deformed particular region of the surface.

14 Claims, 15 Drawing Sheets

Related U.S. Application Data which is a continuation-in-part of application No. 12/652,708, filed on Jan. 5, 2010, now Pat. No. 8,199,124, which is a continuation-in-part of application No. 12/319,334, filed on Jan. 5, 2009, now Pat. No. 7,154,527, which is a continuation-in-part of application No. 11/969,848, filed on Jan. 4, 2008, now Pat. No. 8,547,339, and application No. 12/652,708, which is a continuation-in-part of application No. 13/414,589, filed on Mar. 7, 2012, now Pat. No. 9,274,612.

(60) Provisional application No. 61/223,002, filed on Jul. 3, 2009.

(51) Int. Cl.
  *G06F 3/02* (2006.01)
  *G06F 3/0488* (2013.01)
  *H01H 13/84* (2006.01)

(52) U.S. Cl.
  CPC ......... *G06F 3/04886* (2013.01); *H01H 13/84* (2013.01); *H01H 2215/046* (2013.01); *H01H 2217/018* (2013.01); *H01H 2223/062* (2013.01)

(58) Field of Classification Search
  CPC .............. G06F 3/04886; G06F 3/0414; H01H 2215/046; G09B 21/003–21/004
  USPC .................. 345/156–184; 178/18.01–20.04; 434/112–117
  See application file for complete search history.

(56) References Cited

U.S. PATENT DOCUMENTS

| | | |
|---|---|---|
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,743,895 A | 5/1988 | Alexander |
| 4,772,205 A | 9/1988 | Chlumsky et al. |
| 4,920,343 A | 4/1990 | Schwartz |
| 4,940,734 A | 7/1990 | Ley et al. |
| 4,980,646 A | 12/1990 | Zemel |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,346,476 A | 9/1994 | Elson |
| 5,369,228 A | 11/1994 | Faust |
| 5,412,189 A | 5/1995 | Cragun |
| 5,459,461 A | 10/1995 | Crowley et al. |
| 5,488,204 A | 1/1996 | Mead et al. |
| 5,496,174 A | 3/1996 | Garner |
| 5,496,175 A | 3/1996 | Garner |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,187,398 B1 | 2/2001 | Eldridge |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | Maclean et al. |
| 6,573,844 B1 | 6/2003 | Venolia et al. |
| 6,636,202 B2 | 10/2003 | Ishmael et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,004,655 B2 | 2/2006 | Ferrara |
| 7,015,894 B2 | 3/2006 | Morohoshi |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |

(56) References Cited

U.S. PATENT DOCUMENTS

| | | |
|---|---|---|
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,116,831 B2 | 2/2012 | Meitzler et al. |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |

(56) References Cited

U.S. PATENT DOCUMENTS

| | | |
|---|---|---|
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,294,557 B1 | 10/2012 | Saddik et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,390,771 B2 | 3/2013 | Sakai et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 8,922,503 B2 | 12/2014 | Ciesla et al. |
| 8,922,510 B2 * | 12/2014 | Ciesla ............... G06F 3/0202 345/156 |
| 8,928,621 B2 | 1/2015 | Ciesla et al. |
| 9,035,898 B2 | 5/2015 | Ciesla |
| 9,075,429 B1 | 7/2015 | Karakotsios |
| 9,116,617 B2 | 8/2015 | Ciesla et al. |
| 9,128,525 B2 | 9/2015 | Yairi et al. |
| 9,274,612 B2 | 3/2016 | Ciesla et al. |
| 9,274,635 B2 | 3/2016 | Birnbaum |
| 9,372,539 B2 | 6/2016 | Ciesla et al. |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0125084 A1 | 9/2002 | Kreuzer et al. |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2003/0234769 A1 | 12/2003 | Cross et al. |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0164148 A1 | 7/2005 | Sinclair |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152982 A1 | 7/2007 | Kim et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0131624 A1 | 6/2008 | Egami et al. |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174321 A1 | 7/2008 | Kang et al. |
| 2008/0174570 A1 | 7/2008 | Jobs et al. |
| 2008/0202251 A1 | 8/2008 | Serban et al. |

(56) References Cited

U.S. PATENT DOCUMENTS

| | | |
|---|---|---|
| 2008/0238448 A1 | 10/2008 | Moore et al. |
| 2008/0248836 A1 | 10/2008 | Caine |
| 2008/0249643 A1 | 10/2008 | Nelson |
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2008/0312577 A1 | 12/2008 | Drasler et al. |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1* | 7/2009 | Ciesla ............... G06F 3/04886 345/174 |
| 2009/0181724 A1 | 7/2009 | Pettersson |
| 2009/0182501 A1 | 7/2009 | Fyke et al. |
| 2009/0191402 A1 | 7/2009 | Beiermann et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1 | 9/2010 | Montgomery et al. |
| 2010/0283731 A1 | 11/2010 | Grant et al. |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0028305 A1 | 2/2011 | Lim et al. |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0102462 A1 | 5/2011 | Birnbaum |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0234502 A1 | 9/2011 | Yun et al. |
| 2011/0241442 A1 | 10/2011 | Mittleman et al. |
| 2011/0242749 A1 | 10/2011 | Huang et al. |
| 2011/0248947 A1 | 10/2011 | Krahenbuhl et al. |
| 2011/0248987 A1 | 10/2011 | Mitchell |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1 | 2/2012 | Adachi |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0162774 A1 | 6/2012 | Ishida et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1* | 12/2012 | Ciesla ............... G06F 3/0202 345/173 |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0241718 A1 | 9/2013 | Wang et al. |
| 2013/0275888 A1 | 10/2013 | Williamson et al. |
| 2014/0034469 A1 | 2/2014 | Krumpelman |
| 2014/0043291 A1 | 2/2014 | Ciesla et al. |
| 2014/0132532 A1 | 5/2014 | Yairi et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1 | 1/2015 | Burtzlaff et al. |
| 2015/0029658 A1 | 1/2015 | Yairi et al. |
| 2015/0064405 A1 | 3/2015 | Koch et al. |
| 2015/0070836 A1 | 3/2015 | Yairi et al. |
| 2015/0091834 A1 | 4/2015 | Johnson |
| 2015/0091870 A1 | 4/2015 | Ciesla et al. |

(56) References Cited

U.S. PATENT DOCUMENTS

| | | | |
|---|---|---|---|
| 2015/0138110 | A1 | 5/2015 | Yairi et al. |
| 2015/0145657 | A1 | 5/2015 | Levesque et al. |
| 2015/0177839 | A1 | 6/2015 | Ciesla et al. |
| 2015/0205419 | A1 | 7/2015 | Calub et al. |
| 2015/0293591 | A1 | 10/2015 | Yairi et al. |
| 2015/0293633 | A1 | 10/2015 | Ray et al. |

FOREIGN PATENT DOCUMENTS

| | | | |
|---|---|---|---|
| CN | 1882460 | A | 12/2006 |
| CN | 201130336 | | 10/2008 |
| EP | 2000884 | A1 | 12/2008 |
| EP | 2348801 | A2 | 7/2011 |
| EP | 2936476 | A1 | 10/2015 |
| JP | s63164122 | A | 7/1988 |
| JP | 06125188 | A | 6/1994 |
| JP | 10255106 | | 9/1998 |
| JP | H10255106 | | 9/1998 |
| JP | 2004111829 | A | 4/2004 |
| JP | 2004178117 | A | 6/2004 |
| JP | 2004303268 | A | 10/2004 |
| JP | 2006053914 | A | 1/2005 |
| JP | 2006268068 | A | 10/2006 |
| JP | 2006285785 | A | 10/2006 |
| JP | 2009064357 | A | 3/2009 |
| JP | 2010039602 | A | 2/2010 |
| JP | 2010072743 | A | 4/2010 |
| JP | 2011508935 | A | 3/2011 |
| JP | 2014526106 | A | 10/2014 |
| KR | 20000010511 | | 2/2000 |
| KR | 100677624 | B | 1/2007 |
| WO | 2004028955 | A2 | 4/2004 |
| WO | 2006082020 | A1 | 8/2006 |
| WO | 2008037275 | A | 4/2008 |
| WO | 2009002605 | A | 12/2008 |
| WO | 2009044027 | A2 | 4/2009 |
| WO | 2009067572 | A2 | 5/2009 |
| WO | 2009088985 | A | 7/2009 |
| WO | 2010077382 | A | 7/2010 |
| WO | 2010078596 | A | 7/2010 |
| WO | 2010078597 | A | 7/2010 |
| WO | 2011003113 | A | 1/2011 |
| WO | 2011087816 | A | 7/2011 |
| WO | 2011087817 | A | 7/2011 |
| WO | 2011112984 | A | 9/2011 |
| WO | 2011133604 | A | 10/2011 |
| WO | 2011133605 | A | 10/2011 |
| WO | 2012054781 | A1 | 4/2012 |
| WO | 2013022805 | A1 | 2/2013 |
| WO | 2014095935 | A1 | 6/2014 |

OTHER PUBLICATIONS

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 (Jun. 20, 2012) pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

Jeong et al., "Tunable Microdoublet Lens Array," Optical Society of America, Optics Express; vol. 12, No. 11. 31 May 2004, 7 Pages.

Preumont, A. Vibration Control of Active Structures: An Introduction, Jul. 2011.

\* cited by examiner

USER INTERFACE SYSTEM

CROSS-REFERENCE TO RELATED APPLICATIONS

This application is a continuation of U.S. application Ser. No. 13/481,676, filed 25 May 2012, which is a continuation-in-part of U.S. application Ser. No. 12/652,708, filed on 5 Jan. 2010, now issued as U.S. Pat. No. 8,199,124, which is a continuation-in-part of prior U.S. application Ser. No. 12/319,334, filed on 5 Jan. 2009, now issued as U.S. Pat. No. 8,154,527, which is a continuation-in-part of prior U.S. application Ser. No. 11/969,848, filed on 4 Jan. 2008, now issued as U.S. Pat. No. 8,547,339, all of which are incorporated in their entirety by this reference. U.S. application Ser. No. 12/652,708 claims the benefit of U.S. Provisional Application No. 61/223,002, filed 3 Jul. 2009, which is incorporated in its entirety by this reference.

U.S. application Ser. No. 13/481,676 is also a continuation-in-part of prior U.S. application Ser. No. 13/414,589, filed on 7 Mar. 2012, which is a continuation of U.S. application Ser. No. 12/319,334, filed on 5 Jan. 2009, which is a continuation-in-part of prior U.S. application Ser. No. 11/969,848, filed on 4 Jan. 2008, all of which are incorporated in their entirety by this reference.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
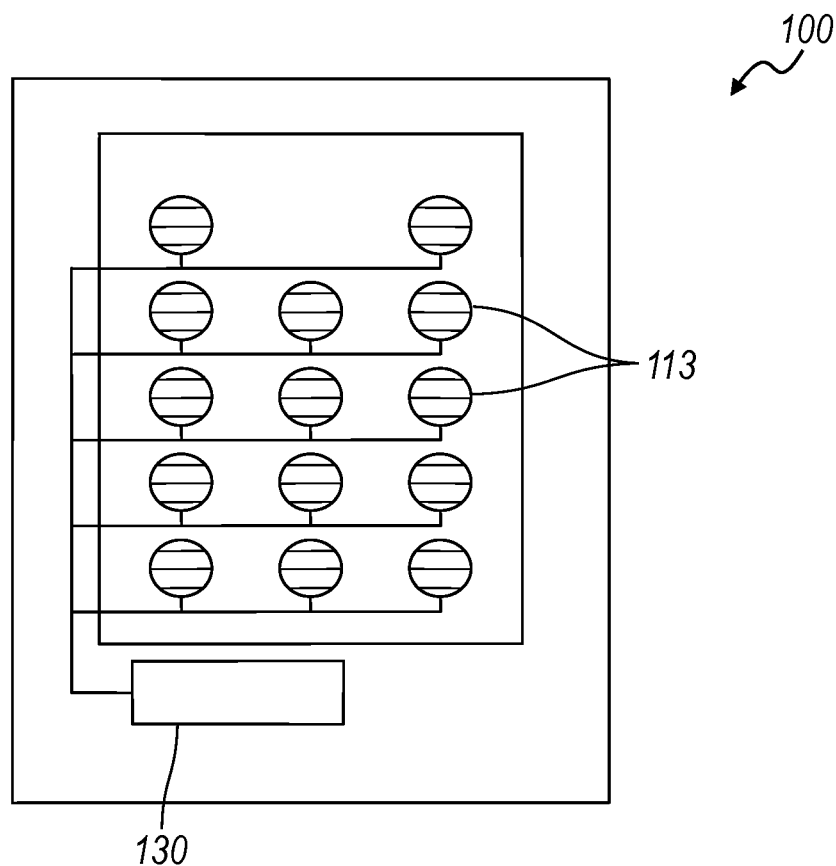
FIG. 1 is a top view of the user interface system of a preferred embodiment.
Figure 2:
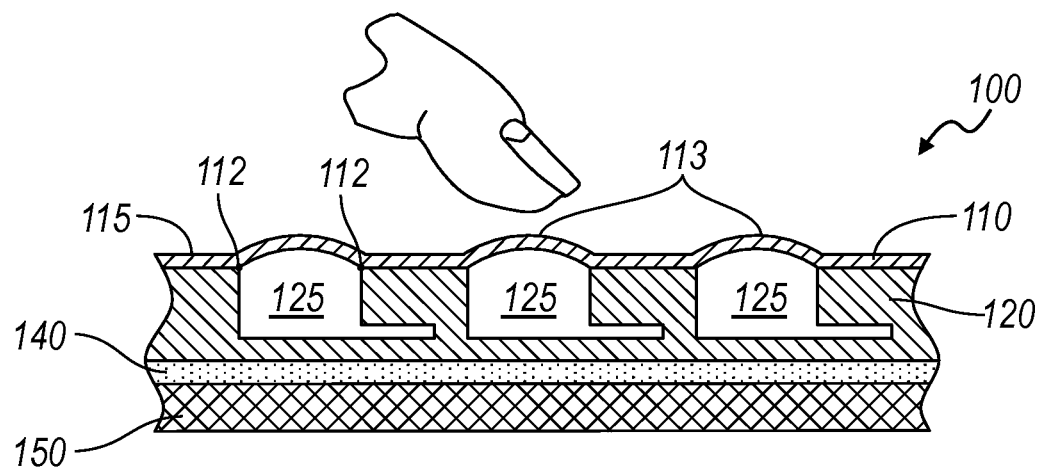
FIG. 2 is a cross-sectional view illustrating the operation of a button array in accordance to the preferred embodiments.

As shown in FIGS. 1 and 2, the user interface system 100 of the preferred embodiment includes: a layer 110 defining a surface 115, a substrate 120 supporting the layer 110 and at least partially defining a cavity 125, a displacement device 130 coupled to the cavity 125 and adapted to expand the cavity 125 thereby deforming a particular region 113 of the surface 115, and a touch sensor 140 that detects inputs from the user. The perimeter of the particular region 113 is at least partially defined by one or more attachment points 112. The user interface system 100 may also include a display 150 coupled to the bottom surface of the substrate 120 and adapted to output images to the user.

The user interface system 100 of the preferred embodiments has been specifically designed to be used as the user interface for an electronic device, more preferably in an electronic device that benefits from an adaptive user interface. The electronic device, which may or may not include a display, is preferably an automotive console, a desktop computer, a laptop computer, a tablet computer, a television, a radio, a desk phone, a mobile phone, a PDA, a personal navigation device, a personal media player, a camera, a watch, a remote, a mouse, a trackpad, or a keyboard. The user interface system 100 may, however, be used as the user interface for any suitable device that interfaces with a user in a tactile and/or visual manner. As shown in FIG. 3, the surface 115 of the user interface system 100 preferably remains flat until a tactile guidance is to be provided at the location of the particular region 113. The surface 115 of the user interface system 100 may also be deformed when a user input is required. At that time, the displacement device 130 expands the cavity 125 to expand the particular region 113, forming a deformation that may be felt by a user, and providing tactile guidance for the user. The expanded particular region 113 preferably also provides tactile feedback when the user applies force onto the particular region 113 to provide input. However, any other arrangement of the user interface system 100 suitable to providing tactile guidance and/or detecting user input may be used.

Figure 3A:
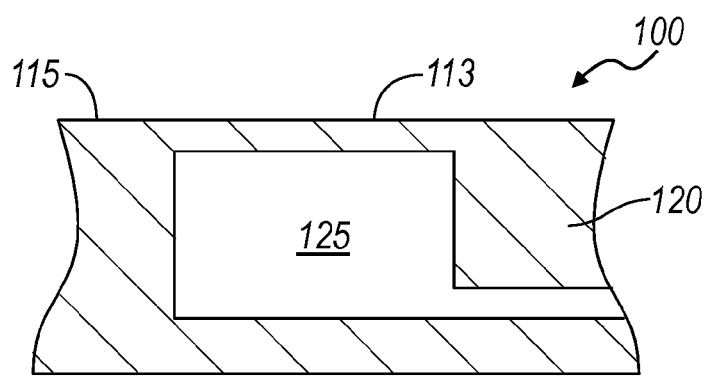
FIGS. 3a, 3b, and 3c are cross-sectional views of the retracted, extended, and user input modes of the preferred embodiments, respectively.
Figure 3B:
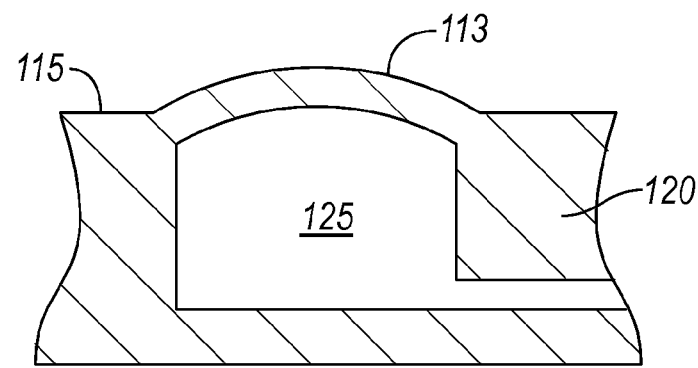
Figure 3C:
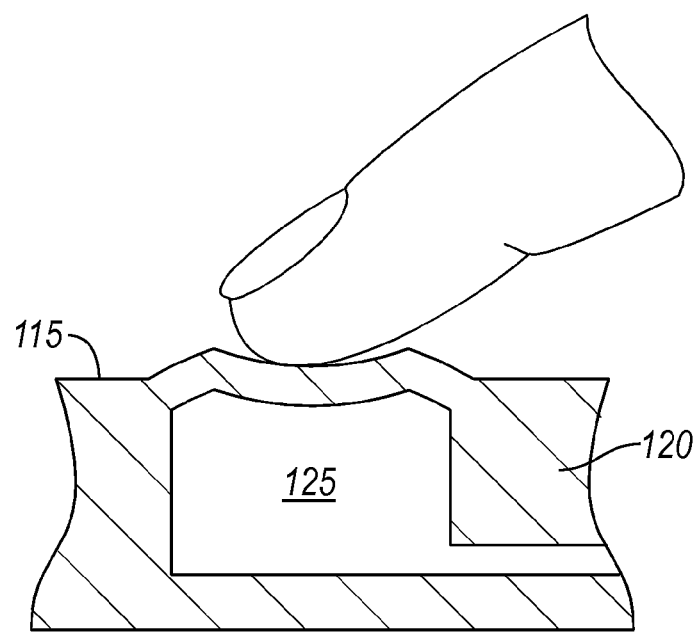

As shown in FIGS. 3a, 3b and 3c, the cavities 125 of the preferred embodiment functions to hold a fluid and to have at least two volumetric settings: a retracted volume setting (shown in FIG. 3a) and an expanded volume setting (shown in FIG. 3b), both of which are actuated by the displacement device 130. When in the expanded volume setting, the user may inwardly deform (or "actuate") the particular region 113 to provide a user input (shown in FIG. 3c). The fluid is preferably a liquid (such as water, glycerin, or ethylene glycol), but may alternatively be a gas (such as air, nitrogen, or argon) or any other substance (such as a gel or aerogel) that expands the cavity 125 and deforms the surface 115. In the expanded volume setting, the cavity 125 expands above the plane of the surface 115, thereby deforming a particular region of the surface 115. The deformation of the particular region 113 functions to provide tactile guidance and/or tactile feedback on the surface 115 for the user. The deformation of the particular region 113 also preferably functions to inform the user of the type of input the deformation represents. For example, the deformation of the particular region 113 may be of a shape that indicates the type of input that the deformation represents. Alternatively, the sheet 110 may include tactile instructions, for example, a pattern of beads or substantially small protrusions that may be felt by the user on the particular region 113 that indicate the type of input the deformation represents. The tactile instructions on the particular region 113 may alternatively be any other type of feature that is able to be felt tactilely by the user.

The layer 110 and the substrate 120 of the preferred embodiment function to cooperatively define the cavity 125. The layer 110 and substrate 120 are preferably similar to the layer and substrate disclosed and taught in U.S. application Ser. No. 12/319,334, but may alternatively be any suitable type. The layer 110 is preferably more pliable than the substrate 120 such that, as the cavity 125 expands, the layer 110 deforms while the substrate 110 remains relatively undeformed. If the user interface system 100 includes a display 150, then the layer 110 and the substrate 120 are preferably both relatively transparent to allow the images displayed by the display 150 to be seen through the layer 110 and the substrate 120. The layer 110 and the substrate 120 may also be index matched to allow light transmitted through without interruption. However, the layer 110 and the substrate 120 may be of any other suitable property. The layer 110 is preferably directly coupled to the substrate 120. Alternatively, the user interface system 100 may include an additional layer 111 that is in arranged in between the layer 110 and the substrate 120. The additional layer 111 may function as a support layer that includes perforations that allow for the fluid to expand the cavity 125 and deform the layer 110 and the particular region of the surface 113. In this variation, the attachment point 112 is preferably arranged to couple the layer 110 to the additional layer 111. Alternatively, the additional layer 111 may deform with the layer 110 and the particular region of the surface 110. In this variation, the attachment point 112 is preferably arranged to couple the additional layer 111 to the substrate 120. However, any other suitable arrangement of the layer 110, the substrate 120, and the attachment point 112 may be used.

Figure 21A:
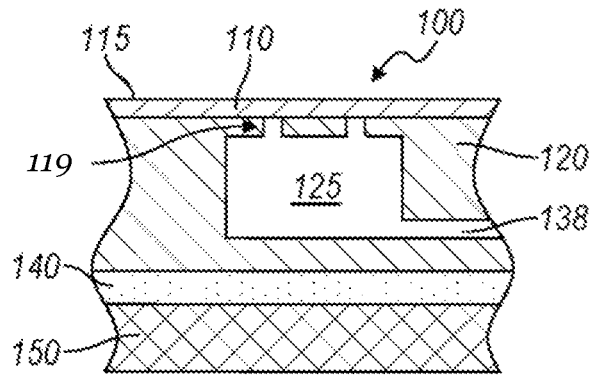
FIGS. 21a and 21b are cross-sectional views of a support member between the layer and the substrate, with the cavity in a retracted volume setting and an expanded volume setting, respectively.
Figure 21C:
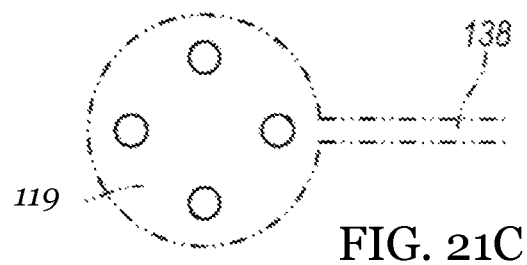
FIG. 21c is a top view of the support member.
Figure 21B:
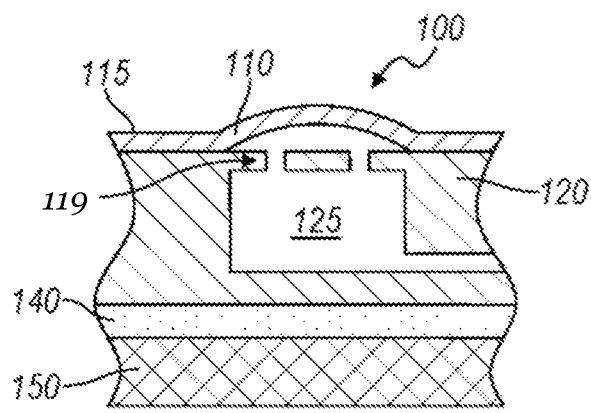
Figure 21D:
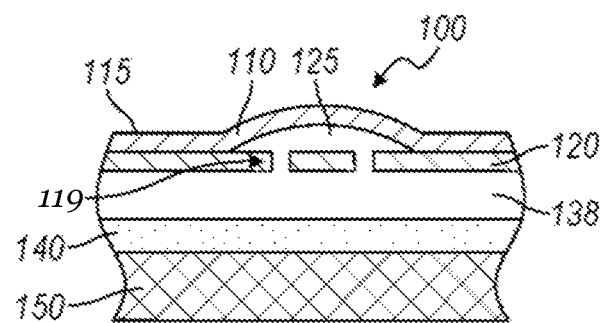
FIG. 21d is a cross-sectional view of an alternative support member that partially defines the cavity.
Figure 22A:
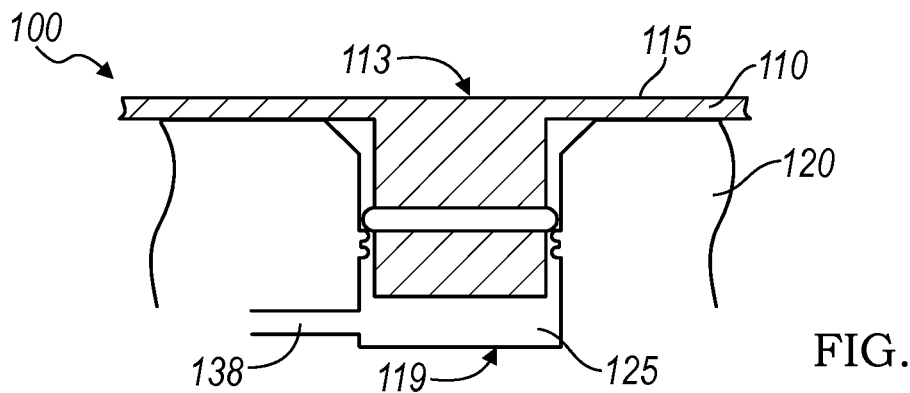
FIGS. 22a-22d are elevation views of variations of the preferred system.
Figure 22B:
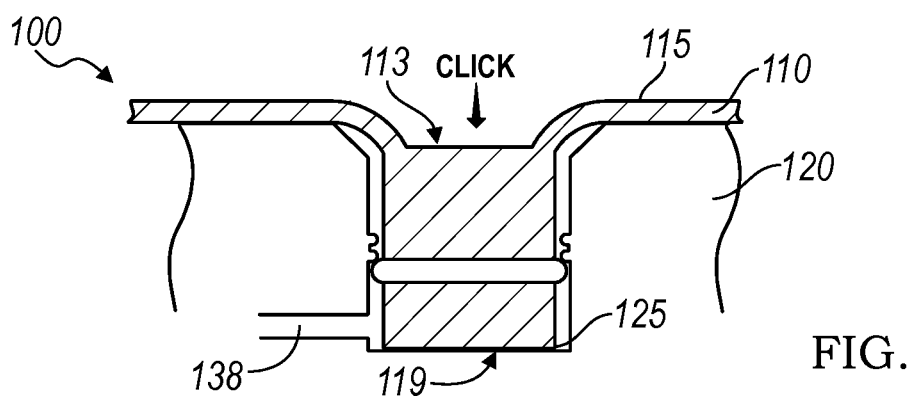
Figure 22C:
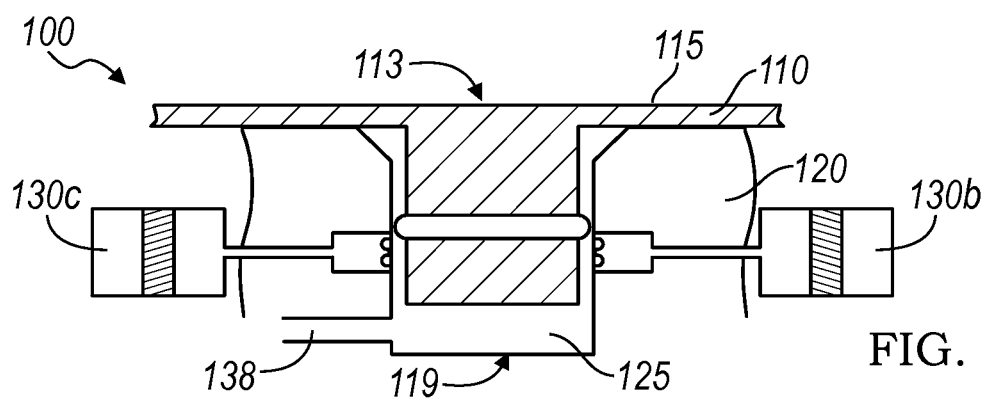
Figure 22D:
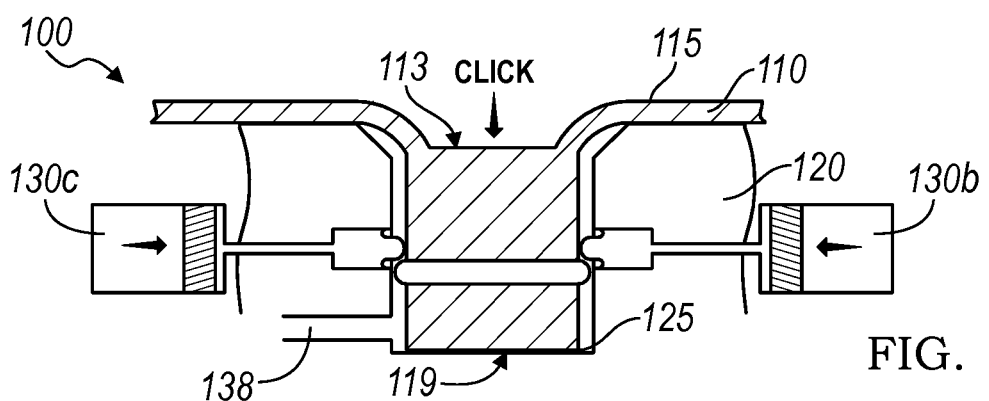
Figure 23A:
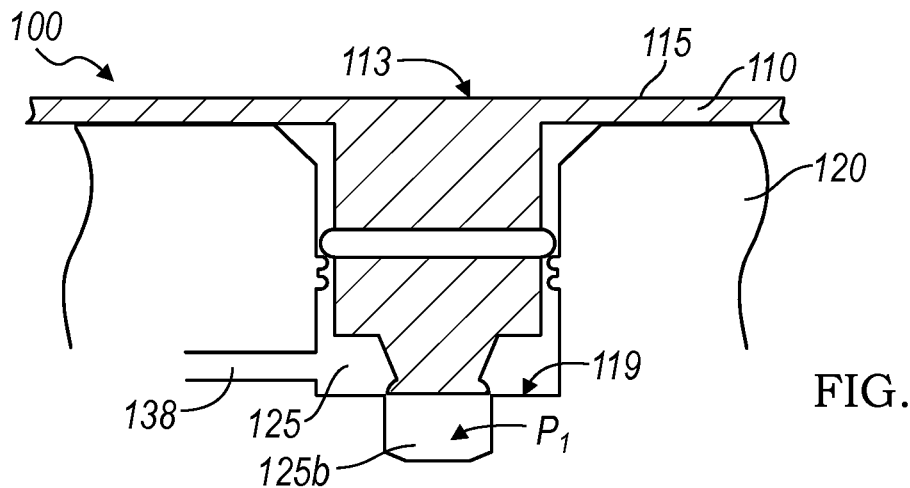
FIGS. 23a-23c are elevation views of one variation of the preferred system.
Figure 23B:
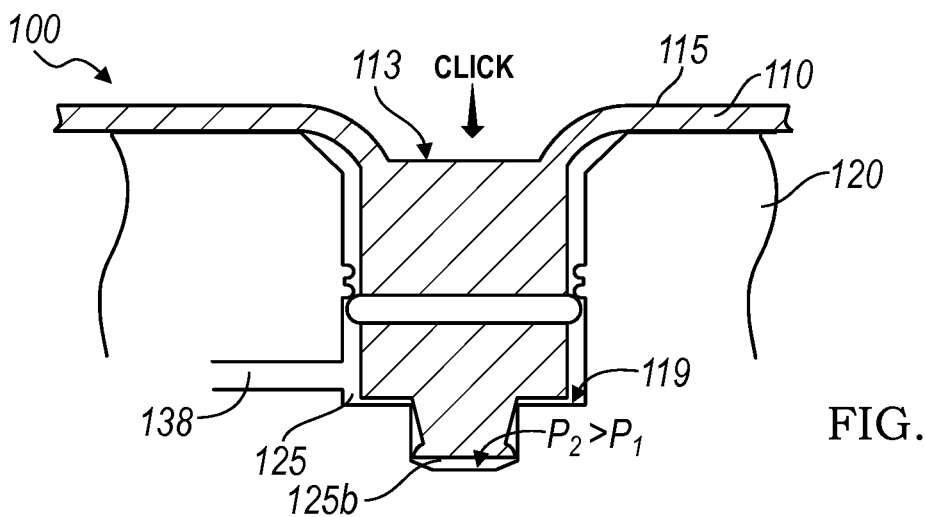
Figure 23C:
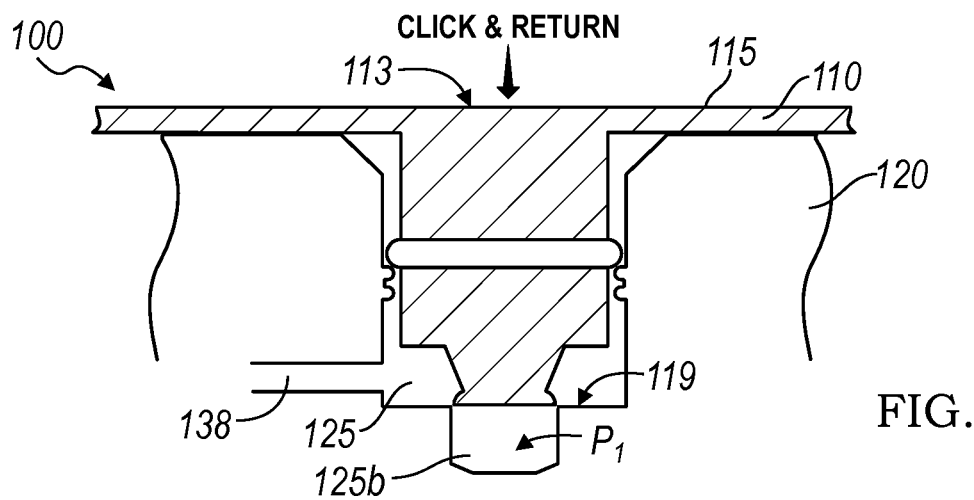

As shown in FIGS. 21a and 21b, the substrate 120 may include a lattice-like support member 119 under the particular region of the surface 115. When the cavity 125 is expanded and the deformation is present in the surface 115, the support member 119 functions to prevent a user from "pressing too far" into the deformation below the plane of the surface 115. When the cavity 125 is not expanded and the deformation is not present in the surface 115, the support member 119 functions to reduce (or potentially eliminate) the user from feeling "divots" in the surface 115 when swiping a finger across the surface 115. As shown in FIG. 21c, the support member 119 preferably includes holes or channels that allow for the expansion of the cavity 125 and the deformation of the surface 115. The support member 119 is preferably integrally formed with the substrate 124, but may alternatively be formed with the layer 110 or may be separately formed and later attached to the substrate 120. Finally, as shown in FIG. 21d, the support member 119 may alternatively partially define the cavity 125. The substrate 120 is preferably rigid, but may alternatively be flexible in one or more directions. The substrate 120—if located above the display 150—is preferably optically transparent, but may—if located below the display 150 or if bundled without a display 150—be translucent or opaque. The substrate 120 is preferably made from a material including polymers or glass, for example, elastomers, silicon-based organic polymers such as poly-dimethylsiloxane (PDMS), thermoset plastics such as polymethyl methacrylate (PMMA), and photocurable solvent resistant elastomers such as perfluropolyethers. The substrate 120 may, however, be made of any suitable material that supports the layer 110 and at least partially defines the cavity 125. In the preferred version, the substrate 120 is a single homogenous layer approximately 1 mm to 0.1 mm thick and can be manufactured using well-known techniques for micro-fluid arrays to create one or more cavities and/or micro channels. In alternative versions, the substrate 120 may be constructed using multiple layers from the same material or from different suitable materials.

As shown in FIG. 2, the touch sensor 140 of the preferred embodiment functions to detect the presence of a user input proximate to the particular region 113 of the surface 115. The touch sensor 140 preferably detects the presence of a user touch by detecting a force that inwardly deforms the deformed particular region 113 or any other portion of the surface 115, but may alternatively detect the presence of a user touch by detecting the presence of the finger at a location proximate to the particular region 113. The touch sensor 140 may be a capacitive sensor, a resistive sensor, a pressure sensor, or any other suitable type of sensor.

Figure 4A:
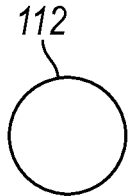
FIGS. 4a and 4b, 5a and 5b, and 6a and 6b are top and cross-sectional views of the circular, rectangular, and ring arrangements, respectively, of the attachment points of the preferred embodiment.
Figure 4B:
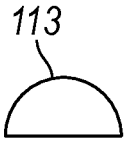
Figure 5A:
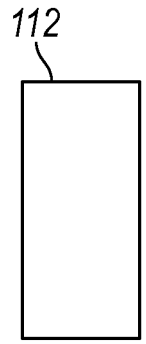
Figure 5B:
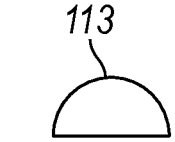
Figure 6A:
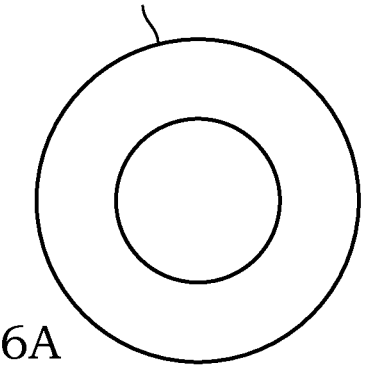
Figure 6B:
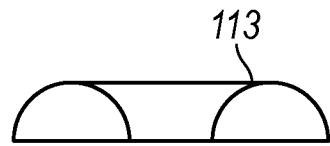

As shown in FIGS. 4-6, the shape of the deformation of the particular region 113 is preferably one that is felt by a user through their finger (or multiple fingers). In a first variation, the shape of the deformation of the particular region 113 preferably acts as and provides the feeling of a button that can be pressed by the user, such as a keyboard (shown in FIGS. 4, 5a, and 5b). In a second variation, the shape preferably acts and provides the feeling of a slider that can be pressed by the user in one location along the slider or that can be swept in a sliding motion along the slider, such as the "click wheel" of the Apple iPod—second generation (shown in FIG. 6). In a third variation, the shape preferably acts and provides the feeling of a pointing stick that can be pressed by the user from multiple directions and/or locations along the surface whereby the user is provided with tactile feedback that distinguishes a first directional touch from a second directional touch and/or a touch in a first location from a touch in a second location, such as the pointing stick marketed by IBM as the TRACKPOINT and by Synaptics as the TOUCHSTYK, which are both informally known as the "nipple". The deformation may, however, act as any other suitable device or method that provides suitable tactile guidance and feedback. In the variation including a display 150, the shape of the deformation of the particular region 113 also preferably functions to minimize the optical distortion of the image underneath the deformed particular region 113.

The shape of the deformation of the particular region 113 is preferably controlled using one of three preferred embodiments. In a first preferred embodiment, the shape is controlled by the location of the attachment points 112 of the layer 110 to the substrate 120. In a second preferred embodiment, the shape is controlled by the geometry of the layer 110 in relation to the attachment points 112. In a third preferred embodiment, the shape is controlled by the material composition of the layer 110 in relation to the attachment points 112. The invention is preferably of one of the three aforementioned embodiments, but may alternatively be any combination or permutation of the three aforementioned embodiments. In other words, the shape of the deformation of the particular region 113 may also be thought of as the result of a formula or combination of characteristics of the particular region 113 of the surface, such as the thickness of the material, the geometry of the material, the modulus of elasticity of the material, and the pressure applied to the particular region 113, and/or the location of the attachment points 112. In addition, any other suitable method for controlling the shape of the deformation of the particular region 113 may be used, for example, the shape of the deformation of the particular region 113 may be changed by adjusting the pressure provided by the displacement device 130 to expand the cavity 125.

1. First Preferred Embodiment

Attachment Point Location

The first preferred embodiment utilizes the location of the attachment points 112 to control the shape of the distortion of the particular region 113. As mentioned above, the perimeter of the particular region 113 is at least partially defined by the attachment points 112. More specifically, the attachment point 112 defines a "transition point" between a first portion of the layer 110 located on a first side of the attachment point 112 that experiences significant deformation (the particular region 113) and a second portion of the layer 110 located on a second side of the attachment point 112 that experiences little or no deformation. In the preferred embodiment, the attachment points 112 are preferably a series of continuous points that define an edge, but may alternatively be a series of non-continuous points. The attachment points 112 are preferably defined during the attachment process of the layer 110 to the substrate 120. For example, the layer 110 may be attached to the substrate 120 using an adhesive, heat treatment, ultra-sonic bonding, oxygen plasma surface treatment, or any other techniques known to one skilled in the art. During the attachment process, a particular region of the layer 110 is left unattached from the substrate 120. The attached region of the layer 110 directly adjacent to this unattached region is defined as the attachment points 112. The attachment points 112 may also be defined during the manufacturing of the layer 110 and the substrate 120. For example, the substrate 120 may be manufactured with attachment geometry (e.g. a hole) and the layer 110 may be manufactured with a reciprocating attachment geometry (e.g. a post). Upon attachment of the layer 110 to the substrate 120, the attachment geometry is engaged, attaching the layer 110 to the substrate 120 and defining the attachment points 112. However, any other method suitable to defining the attachment points 112 may be used.

Figure 7A:
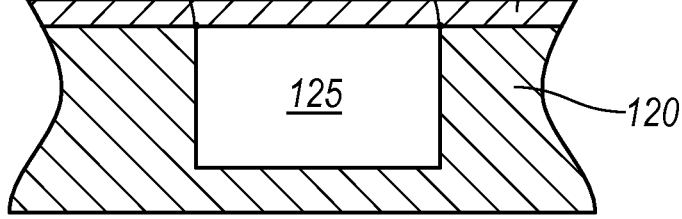
FIGS. 7a and 7b are cross-sectional views of the retracted and extended states, respectively, of the first variation of the first preferred embodiment.
Figure 7B:
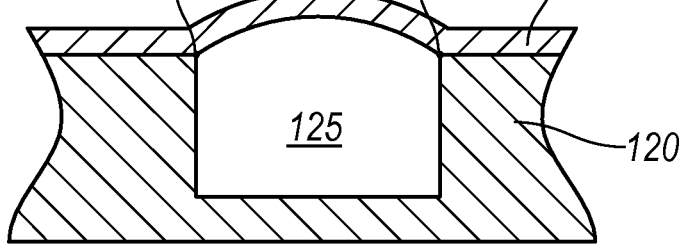
Figure 8A:
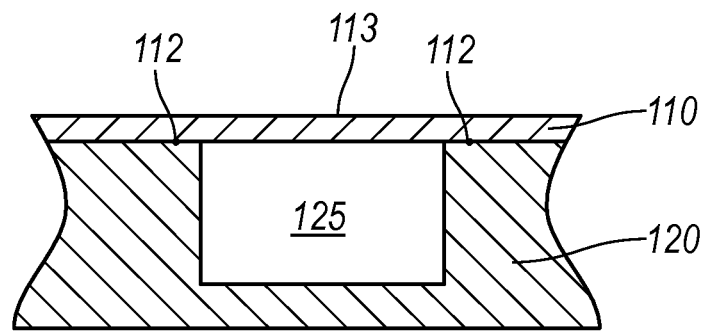
FIGS. 8a and 8b are cross-sectional views of the retracted and extended states, respectively, of the second variation of the first preferred embodiment.
Figure 8B:
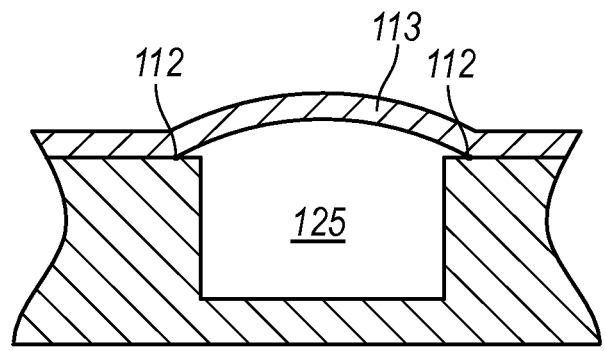
Figure 9A:
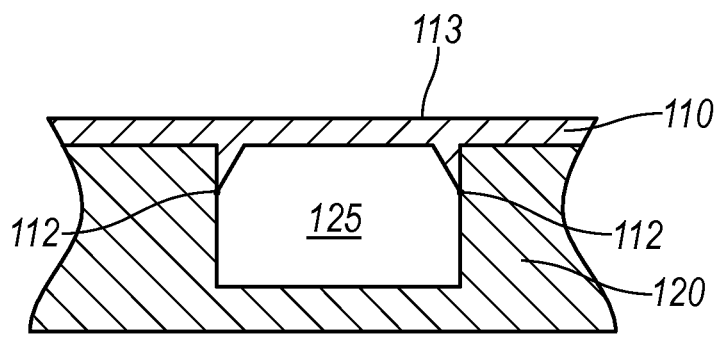
FIGS. 9a and 9b are cross-sectional views of the retracted and extended states, respectively, of the third variation of the first preferred embodiment.
Figure 9B:
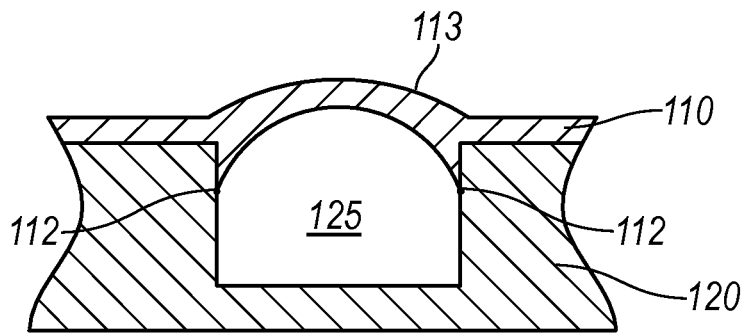

The attachment points 112 preferably define the perimeter of the particular region 113 into a shape selected from (1) a substantially circular region (shown in FIG. 4) that preferably results in a dome-like deformation, (2) a rectangular region (shown in FIG. 5) that preferably results in a ridge-like deformation, (3) a square region (not shown) that preferably results in a square shaped deformation, such as those seen in keyboards, (4) a ring-like region (as shown in FIG. 6) that preferably results in a ridge-like deformation in the form of a ring, and/or any other suitable shape for the particular region 113. As the cavity 125 is deformed by the displacement device 130, the particular region 113 is deformed. The particular region 113 is preferably adjacent to the cavity 125 and/or partially defines the cavity 125, allowing deformation of the cavity 125 to directly deform the particular region 113, but may alternatively be located in any other suitable location. Because the particular region 113 is located adjacent to the cavity 125, the location of the attachment points 112 relative to the cavity 125 have a direct effect on the shape of the deformation of the particular region 113. As shown in FIGS. 7a and 7b, the attachment points 112 at first positions that are closer to the center of the cavity 125 may lead to a dome-like deformation with a first diameter along the surface 115. As shown in FIGS. 8a and 8b, attachment points 112 at second positions that are farther away from the center of the cavity 125 than the first positions, may lead to a dome-like deformation with a second diameter along the surface 115 that is larger than the first diameter. As shown in FIGS. 9a and 9b, attachment points 112 at third positions that are closer to the center of the cavity 125 than the first positions may lead to a dome-like deformation with a third diameter that is smaller than the first diameter. The described attachment points may also lead to dome-like deformations with a first, second, and third height respectively and/or a first, second and third curvature respectively that may be adjusted by varying the level of deformation caused by the displacement device 130. For example, if the level of deformation or level of change in fluid volume caused by the displacement device 130 is constant, because the deformation or fluid of the cavity is spread over a larger surface area in the variation shown in FIGS. 8a and 8b and spread over a smaller surface area in the variation shown in FIGS. 9a and 9b, the tactile feedback felt by the user from the particular region 113 in the variation shown in FIGS. 8a and 8b is of a softer surface than that felt in the variation shown in FIGS. 9a and 9b.

The attachment points 112 may also be located along the wall of the cavity 125 at an "depth" lower than the rest of the layer 110. The attachment points 112 are preferably symmetric relative to the center of the cavity 125, but may alternatively be asymmetric relative to the center of the cavity 125. However, the attachment point 112 may be located in any other location and/or arrangement suitable to achieve the desired shape and feel for the deformation of the particular region 113.

2. Second Preferred Embodiment

Geometry

The second preferred embodiment utilizes geometry of the layer 110 in relation to the attachment points 112 to control the shape of the deformation of the particular region 113. The attachment points 112 of the second preferred embodiment are preferably similar or identical to those of the first preferred embodiment. The geometry of the layer 110 in relation to the attachment points 112 preferably create regions of higher pliability and regions of lower pliability. As the cavity 125 is expanded, the particular region 113 is deformed to accommodate for the adjusted volume and pressure. The regions of higher pliability will deform (e.g. stretch, bend, and/or compress) more while the regions of lower pliability will deform less. The implementation of certain combinations of regions of relatively higher pliability and regions of relatively lower pliability along the layer 113 allows for the control of the shape of the deformation of the particular region 113. Implementation of such regions is preferably achieved in one of several variations.

2.1 Second Preferred Embodiment

First Variation

Figure 10A:
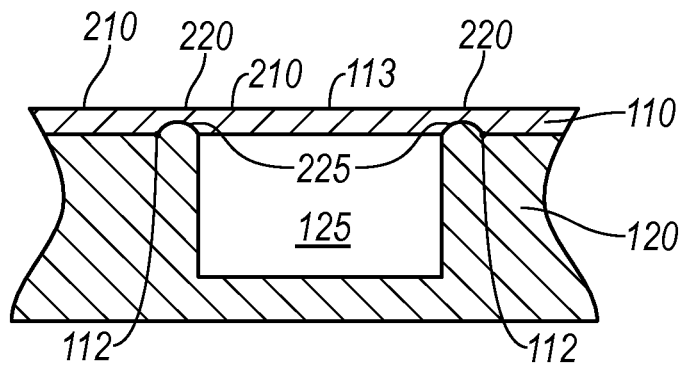
FIGS. 10a and 10b, 11a and 11b, and 12a and 12b are cross-sectional views of the retracted and extended states of the first variation of the second preferred embodiment with thin regions at the attachment point, thin regions closer to the center of the cavity than the attachment point, and with multiple thin regions, respectively.
Figure 10B:
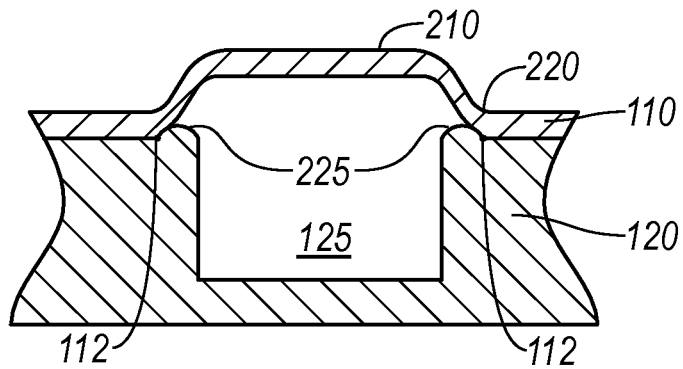
Figure 11A:
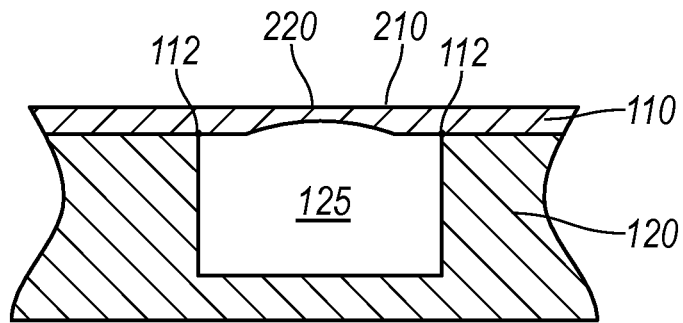
Figure 11B:
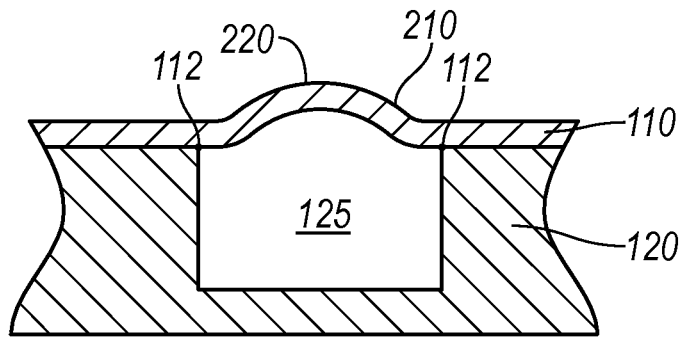

In a first variation of the second preferred embodiment, as shown in FIGS. 10a and 10b, the layer 110 includes a first portion 210 with a first thickness and a second portion 220 with a second thickness that is less than the first thickness. The surface 115 is preferably planar, thus the thickness is preferably "removed" from the side of the layer 110 opposite of the surface 115, but may be "removed" from any other suitable portion of the layer 110 that does not cause the side of the layer 110 that defines the surface 115 to be noticeably non-planar. In this variation, the layer 110 is preferably of a homogenous or uniform material. The layer 110 may also include a third portion (not shown) of a third thickness that is less than the first thickness, but greater than the second thickness. The third portion may alternatively be of a varying thickness and functions as a transitional region between the first portion 210 and the second portion 220. The third portion may alternatively function to provide additional control of the shape of the deformation of the particular region 113. For example, in the variation wherein the deformation of the particular region 113 is a square-like deformation, the third portion may function to form a concave top surface, providing the user with a tactile indication of where to place their finger, similar that seen on a key of a keyboard. The second portion 220 effectively acts as a material with higher pliability than the first portion 210 and substantially biases the particular region 113 to deform at a higher degree at the second portion 220 than at the first portion 210. The second portion 220 of the layer 110 may be located adjacent to the attachment points 112 (shown in FIG. 10a), resulting in a higher degree of deformation at the attachment points 112 (shown in FIG. 10b), but may alternatively be located closer to the center of the cavity 125 than the attachment points 112, as shown in FIG. 11a, resulting in a lesser degree of deformation at the attachment points 112 and a higher degree of deformation at the second portion 220 of the layer 110, as shown in FIG. 11b. However, the second portion 220 of the layer 110 may be located in any other suitable location where a higher degree of deformation is desired. The user may feel the pliability differences between the first portion 210 and the second portion 220. Because the thickness of the second portion 220 is preferably "removed" from the side of the layer 110 opposite of the surface 115, the surface of the substrate 120 that interfaces with the layer 110 may include a mating geometry 225 to support the layer 110 at the second portion 220 and decrease the difference felt by the user between the first and second portions 210 and 220, as shown in FIG. 10a and 10b. The combination of the first portion 210 and the second portion 220 may also result in a deformation shape that is no longer a typical dome-like shape. For example, as shown in FIG. 10a and 10b, the resulting shape is preferably a button with a relatively flat top. If the user interface system 100 is provided with a display 150, this may be advantageous in preventing the optical distortion of an image that is displayed on a display 150 underneath the particular region 113.

Figure 12A:
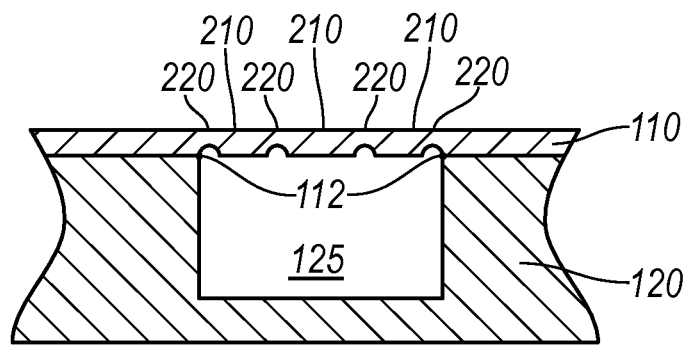
Figure 12B:
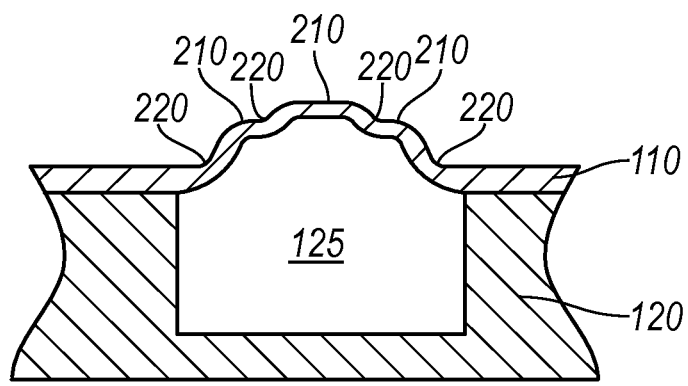

As shown in FIG. 12a, a plurality of first and second portions 210 and 220 may be included in the layer 110, which results in a deformation shape of a nub with bellows, as shown in FIG. 12b. This shape may be useful in the application of a pointing stick by allowing for a higher degree of tactile feedback (e.g. from the elastic response of the plurality of second portion 220S) when the user pushes the deformation in a variety of directions. However, any other suitable arrangement of the thinner second portion 220S may be used.

Figure 13A:
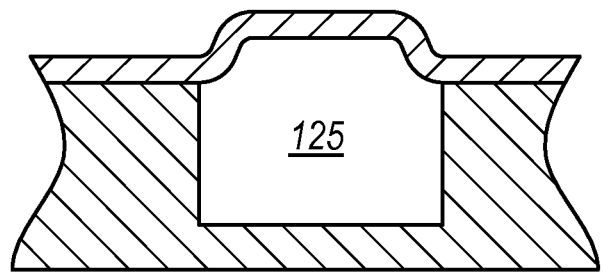
FIGS. 13a and 13b are cross sectional views of the fully expanded and user actuated states, respectively, of the particular region.
Figure 13B:
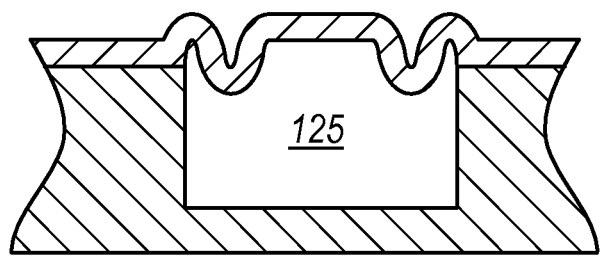

The combination of first and second portion 220S may be used to create a "living" or "natural" hinge, such as those seen in commonly used snap top bottle caps. The natural hinge for the deformation of the particular region 113 preferably allows for two states, an extended state and a retracted state. When the cavity 125 is not deformed, the particular region is preferably in the retracted state. As the cavity 125 is expanded, the particular region 113 is preferably transitioned into an expanded state. When the cavity 125 is returned to the not deformed state, the particular region 113 is also preferably returned to the retracted state. Alternatively, as shown in FIGS. 13a and 13b, the "living" or "natural" hinge may function to provide a third state to the deformation of the particular region 113. For example, the expanded state of the deformation of the particular region 113 may include two states: the fully expanded state (as shown in FIG. 13a) and the user actuated state (as shown in FIG. 13b). The fully expanded state functions to provide the user with tactile guidance and the actuated state functions to provide the user with the tactile indication that the user has applied a force to the system. The user actuated state is preferably of an expansion that is in between the retracted state and the fully expanded state. Once the force applied by the user is removed, the deformed particular region preferably returns to the fully actuated state until the cavity 125 is no longer expanded. In other words, the expanded state of the deformation of the particular region 113 is a bi-modal geometry. This may be applied in user scenarios wherein the user interface system 100 provides tactile guidance for a "clickable" button (e.g. a keyboard key).

The thinner second portion 220 is preferably created during the manufacturing process of the layer 110. For example, the layer 110 may be molded to contain the first portion 210, thinner second portion 220, and/or the third portion. The thinner second portion 220 may also be created after the layer 110 has been made. For example, the layer 110 may be molded as a continuous sheet with uniform thickness. The thinner second portion 220 is then created through a cutting process that removes an amount of thickness from the second portion 220 of the layer 110. However, any other suitable method and/or process to create the second portion 220 may be used.

2.2 Second Preferred Embodiment

Second Variation

Figure 14A:
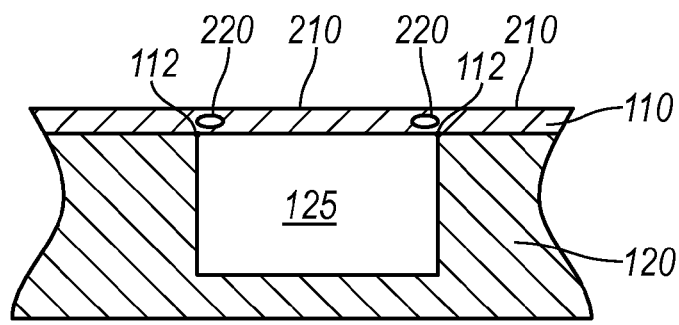
FIGS. 14a and 14b are cross-sectional views of the second variation of the second preferred embodiment with a pocket within the layer in the retracted and extended state.
Figure 14B:
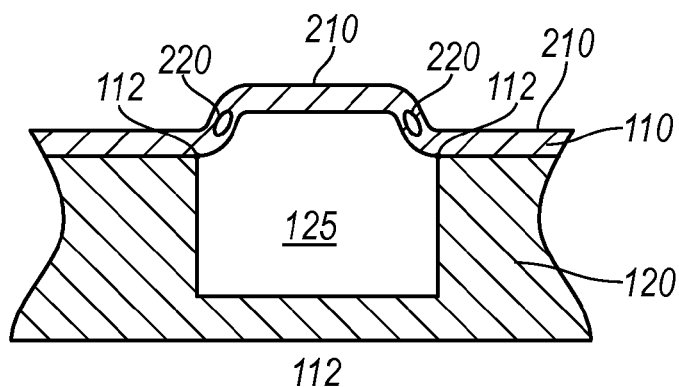

In a second variation of the second preferred embodiment, as shown in FIG. 9, the layer 110 preferably includes a second portion 220 that defines a pocket (or "void") within the layer 110 and a first portion 210 that is continuous and does not define a cavity. In this variation, the layer 110 is preferably made of a uniform material. The layer 110 may also include a third portion that defines a pocket smaller than the pocket of the second region 220. The third portion may alternatively define a pocket of varying size and functions as a transitional region between the first portion 210 and the second portion 220. The third portion may alternatively function to provide additional control of the shape of the deformation of the particular region 113. For example, in the variation wherein the deformation of the particular region 113 is a square-like deformation, the third portion may function to form a concave portion of the square, providing the user with a tactile indication of where to place their finger, similar that seen on a key of a keyboard. The second portion 220 effectively acts as a material with higher pliability than the first portion 210 and substantially biases the particular region 113 to deform at a higher degree at the second portion 220 than at the first portion 210, as shown in FIGS. 14a and 14b. The second portion 220 of the second variation preferably functions similarly or identically to the second portion 220 of a second thickness in the first variation.

The pocket is preferably defined during the manufacturing process of the layer 110, for example, the layer 110 may be manufactured using a plurality of thin-layers that are stacked. Thin-layers that are placed towards the middle of the layer 110 preferably define a hole while thin-layers that are placed on the top and bottom of the layer 110 are preferably continuous (e.g. do not define a hole). When stacked, the completed layer 110 will contain the second portion 220 that defines a pocket. The pocket may alternatively be defined in a post-manufacturing process, for example, a heat treatment in a particular location along the layer 110 that causes the material of the layer 110 to shrink at the particular location, causing a pocket to form internally. The pocket may also be filled with a fluid, gel, or any other suitable material that has a refractive index that is substantially identical to that of the sheet 110. This will allow the second portion 220 to be a region of higher pliability while remaining substantially invisible to the user. However, any other method and/or process suitable to creating the pocket may be used. Additionally, similar to the first variation, the layer 110 may include a plurality of first and second portions 210 and 220 to create a desired shape for the deformation of the particular region 113.

Figure 15A:
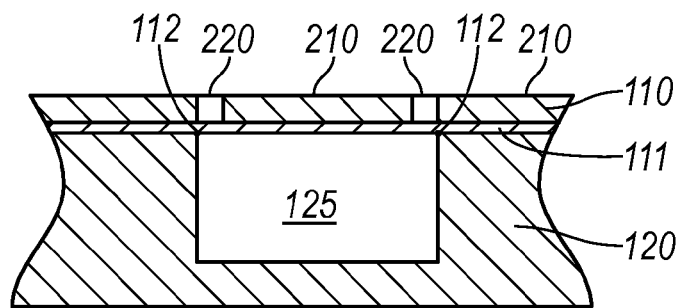
FIGS. 15a and 15b are cross-sectional and top views, respectively, of the second variation of the second preferred embodiment with a pocket through the thickness of the layer.
Figure 15B:
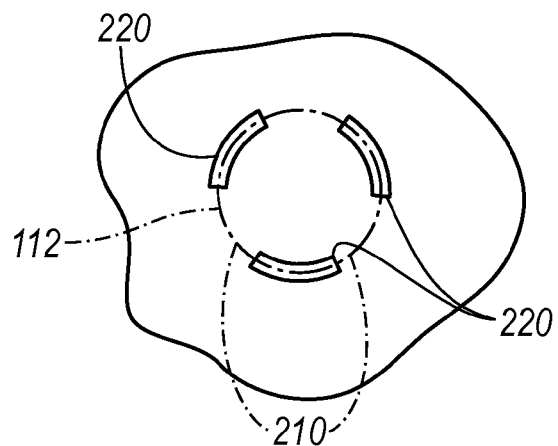

As shown in FIGS. 15a and 15b, the pocket may extend through the entire thickness of the layer 110 (thereby creating a "canyon") and alternated with first portions that do not define a pocket. In this variation, the pocket is preferably isolated from the cavity 125, preferably by the additional layer 111, but may alternatively be by any other suitable method. In this variation, the additional layer 111 preferably functions to prevent leakage of the fluid from the cavity 125 through the layer 110 onto the surface 115. The additional layer 111 is preferably continuous without any perforations, preventing the passage of the fluid through the additional layer 111 to the layer 110 where the fluid may leak through the pocket onto the surface 115. Alternatively, the additional layer 111 may function to allow fluid to pass through proximal to the first portion 210 of the layer 110 that does not include pockets and to prevent fluid to pass through proximal to the second portion 220 of the layer 110 (for example, by forming a webbing between the additional layer 111 and the layer 110 that directs flow of fluid as desired), thus preventing fluid from leaking out the pockets to the surface 115. However, the additional layer 111 may prevent leakage of fluid through the layer 110 to the surface 115 in any other suitable method. The pocket of this variation may also be defined using the layering method of thin-layers described above, but may alternatively be defined in a post-manufacturing process, for example, a stamping process. The layer 110 may be manufactured as a continuous sheet using any suitable method and then cut using a cutting die, creating a pocket through the thickness of the layer 110. The cutting die may create a plurality of pockets at one time, but may alternatively create one pocket at a time. However, any other method and/or process suitable to creating the pocket may be used.

The pocket of the second variation is preferably of a circular shape (e.g., spherical or cylindrical), but may alternatively be of an arc shape, a rectangular shape (e.g., a rectangular prism), or any other shape suitable to providing the desired geometry of the deformation of the particular region 113.

2.3 Second Preferred Embodiment

Third Variation

Figure 16A:
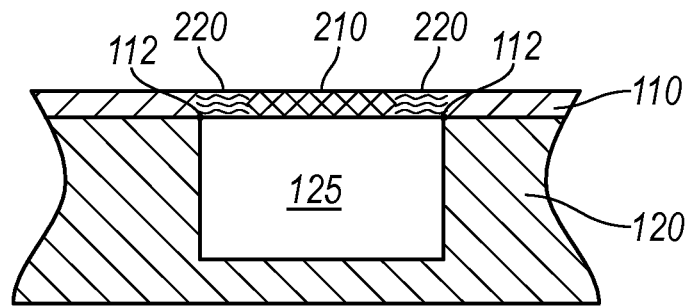
FIGS. 16a and 16b are cross-sectional views of the third variation of the second preferred embodiment in the retracted and extended states, respectively.
Figure 16B:
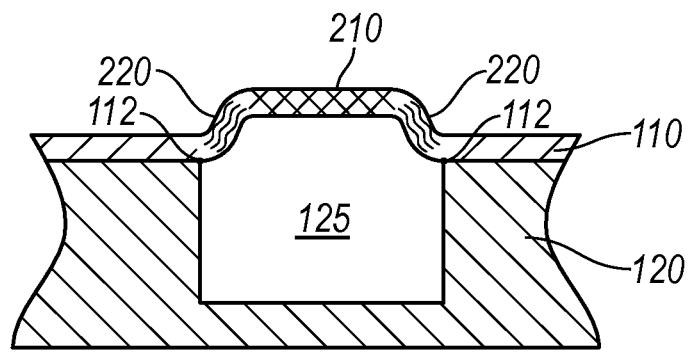

In a third variation of the second preferred embodiment, as shown in FIG. 10, the layer 110 is preferably constructed of a material wherein the molecules, fibers, or an other suitable component of the material may be aligned in a particular direction to influence the overall pliability (i.e., elastic modulus) of the material, for example, the pliability of a polymer material. In this variation, the layer 110 preferably includes a first portion 210 wherein the components of the material are aligned in a first direction and a second portion 220 wherein the components of the material are aligned in a second direction. The effective pliability of the layer 110 seen from the force applied by the deformed cavity 125 is preferably higher in the second portion 220 than the first portion 210. For example, in the variation where the layer 110 is a polymer material, polymers molecules that are aligned in a parallel fashion are less structurally resistant to force applied perpendicular to the molecules than a force applied along the direction of alignment. Additionally, polymer molecules that are arranged in a lattice structure (e.g., a "criss-cross" pattern) are also relatively structurally resistant to applied force. Because of these material properties, in this example, the molecules are aligned perpendicular to the force resulting from the deformation of the cavity 125 in the second portion 220 and parallel to the force resulting from the deformation of the cavity 125 and/or arranged in a lattice pattern in the first portion 210 (as shown in FIGS. 16a and 16b). The layer 110 may also include a third portion wherein the molecules are aligned at an angle in between a perpendicular angle and a parallel angle to the force resulting from the deformation of the cavity 125. This third portion preferably functions as a transitional region between the first portion 210 and the second portion 220. The third portion may alternatively function to provide additional control of the shape of the deformation of the particular region 113. For example, in the variation wherein the deformation of the particular region 113 is a square-like deformation, the third portion may function to form a concave portion of the square, providing the user with a tactile indication of where to place their finger, similar that seen on a key of a keyboard. The second portion 220 effectively acts as a material with higher pliability than the first portion 210 and substantially biases the particular region 113 to deform at a higher degree at the second portion 220 than at the first portion 210. The second portion of the third variation preferably functions similarly or identically to the second portion of a second thickness in the first variation. However, any other arrangement of the components of the material of the layer 110 suitable to establishing a first and second portion may be used. Additionally, similar to the first variation, the layer 110 may include a plurality of first and second portions 210 and 220 to create a desired shape for the deformation of the particular region 113.

Implementation of regions of higher pliability and regions of lower pliability is preferably achieved in one of the above variations, but may alternatively be of any combination or permutation of the above variations or any other suitable variations.

3. Third Preferred Embodiment

Material

The third preferred embodiment utilizes the material composition of the layer 110 in relation to the attachment points 112 to control the shape of the deformation of the particular region 113. The attachment points 112 of the third preferred embodiment are preferably similar or identical to those of the first preferred embodiment. The material composition of the layer 110 in relation to the attachment points 112 preferably create regions of higher pliability and regions of lower pliability. As the cavity 125 is expanded, the particular region 113 is deformed to accommodate for the adjusted volume and pressure. The regions of relatively higher pliability will deform (e.g. stretch, bend, and/or compress) more while the regions of relatively lower pliability will deform less. The implementation of certain combinations of these regions along the layer 113 allows for the control of the shape of the deformation of the particular region 113. Implementation of such regions of relatively higher pliability and regions of relatively lower pliability is preferably achieved in one of several variations.

Figure 17A:
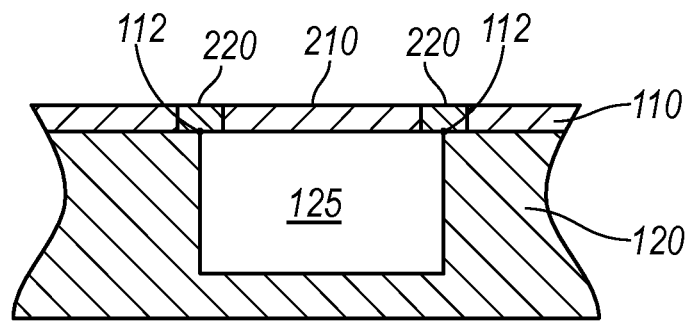
FIGS. 17a and 17b are cross-sectional views of the first variation of the third preferred embodiment in the retracted and extended states, respectively.
Figure 17B:
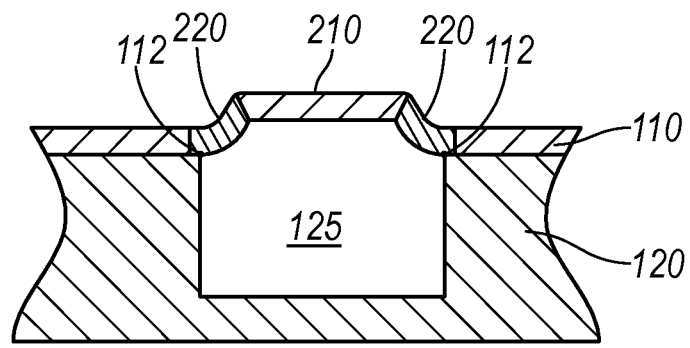
Figure 18A:
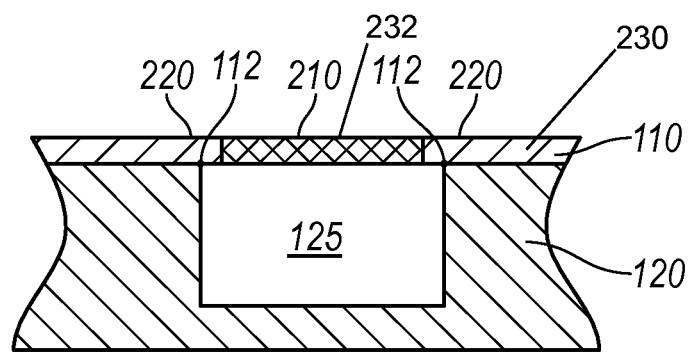
FIGS. 18a and 18b are cross-sectional views of the second variation of the third preferred embodiment in the retracted and extended states, respectively.
Figure 18B:
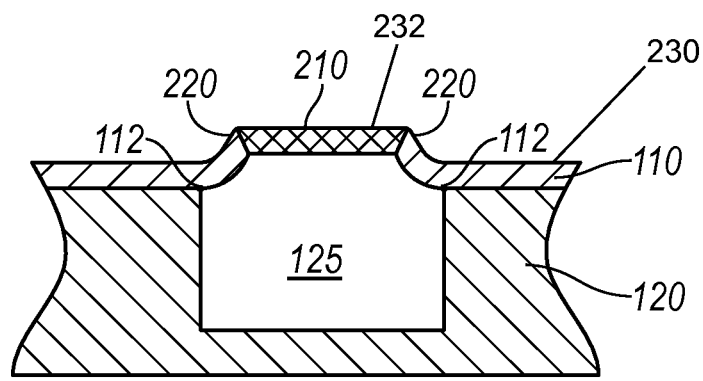

In a first variation of the third preferred embodiment, as shown in FIGS. 17a and 17b, the layer 110 may include a first portion 210 of a first type of material and a second portion 220 of a second type of material. The second type of material preferably has a higher pliability than the first type of material, resulting in higher pliability of the second portion 220 than the first portion 210. The second portion 220 of this first variation of the third preferred embodiment preferably functions similarly or identically to the second portion 220 of the first variation of the second preferred embodiment.

The first and second portions 210 and 220 are preferably assembled during the manufacturing of the layer 110. For example, the layer 110 may be created using a double injection molding process such that the first and second types of material are bonded during the injection molding process. However, any other manufacturing method suitable to combine two types of material may be used. The first and second portions 210 and 220 may alternatively be assembled in a post-manufacturing process. For example, the first portion 210 and the second portion 220 may be manufactured independently and then bonded together using adhesive, heat treatment, ultra-sonic boding, oxygen plasma surface treatment, or any other techniques known to one skilled in the art. However, any other suitable manufacturing method may be used. Additionally, similar to the first variation of the second preferred embodiment, the layer 110 may include a plurality of first and second portions 210 and 220 to create a desired shape for the deformation of the particular region 113.

In a second variation of the third preferred embodiment, as shown in FIGS. 18a, 18b, 19, and 20, the layer 110 is preferably made of a base material 230 and includes a modifier material 232 that changes the pliability properties of the layer 110 (for example, lower pliability). The modifier material 232 preferably changes the pliability of the base material 230 by providing a physical structure that mechanically interacts with and affects the pliability of the base material, for example, by providing a scaffold or a support structure across the base material 230 and decreasing pliability in locations of the layer 110 which include the modifier material 232. In a second example, the modifier material 232 may change the pliability of the base material 230 by chemically interacting with the base material, for example, the modifier material 232 chemically reacts with the base material 230 to form a third material of lower pliability than the base material. The chemical reaction preferably occurs during the manufacturing process, but may alternatively occur post-manufacturing, for example, the user may activate the reaction electrically or mechanically. However, the modifier material 232 may modify the pliability of the base material 230 in any other suitable manner. In a first example of the modifier material 232, the modifier material 232 is embedded into a first portion 210 of the layer 110, decreasing the pliability at the first portion 210, and a second portion 220 that includes only the base material. Alternatively, the modifier material 232 may be embedded into the second portion 220 of the layer 110 to increase pliability and the first portion 210 is without the modifier material 232.

Figure 19:
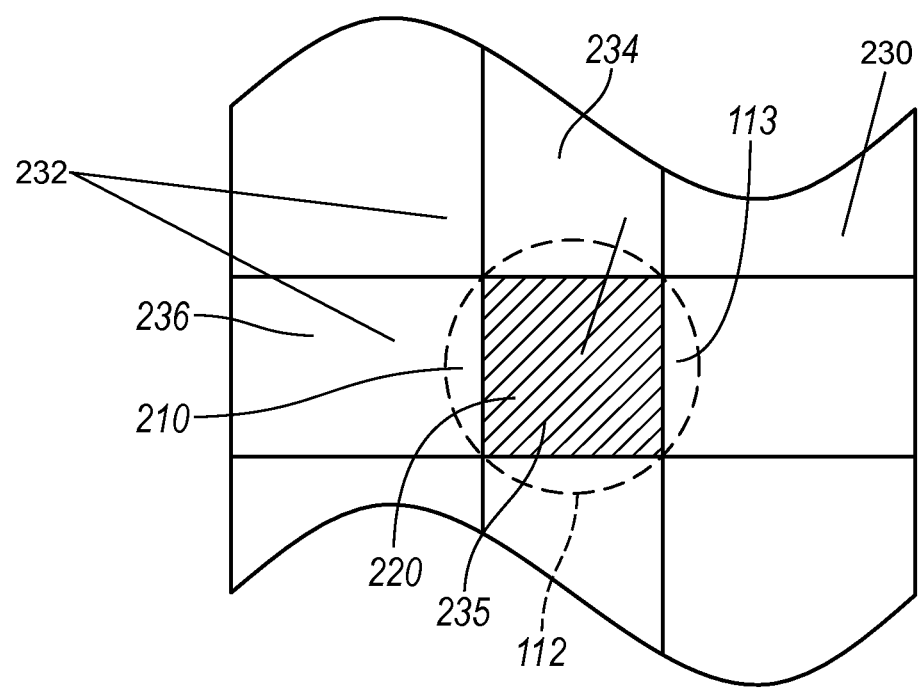
FIGS. 19 and 20 are top views of examples of the second variation of the third preferred embodiment.

In the second example of the modifier material 232, the modifier material 232 may include a secondary material 234 and a tertiary material 236, as shown in FIG. 19, where the combination of the secondary material and the tertiary material changes the pliability properties of the layer 110. The secondary material 234 may be arranged lengthwise along the layer 110 and the tertiary material 236 may be arranged widthwise along the layer 110 and secondary and tertiary materials 234 and 236 overlap at an intersection 235. At the locations where the secondary and tertiary materials 234 and 236 overlap, the secondary material 234 and the tertiary material 236 combine to form an area of different pliability characteristics (for example, higher pliability). In the example as shown in FIG. 19, the intersection 235 is located within the particular region 113 and forms a second portion 220 of increased pliability, but the intersection 235 may alternatively form a first portion 210 of decreased pliability. Alternatively, the second example of the modifier material 232 may be of a material type that changes pliability in a direct relationship with the amount of material present, for example, a material where the thickness of the material determines pliability. Similar to the variation of the modifier that includes a secondary material 234 and a tertiary material 236, a portion of the modifier material 232 may be arranged lengthwise along a the layer 110 and a second portion of the modifier material 232 may be arranged widthwise along the layer 110 wherein the first and second portions of the modifier material 232 overlap at an intersection 235. At the locations where the first and second portions overlap, a region with a substantially higher content of the modifier material 232 forms, changing the pliability characteristics of the region. In these variations of the second example of the modifier material 232, the region wherein the secondary and tertiary materials 234 and 236 are not combined or where the content of the modifier material 232 is lower may also have a different pliability characteristic from the base material. However, any other suitable arrangement of modifier material 232 may be used.

In a third example of the modifier material 232, the modifier material 232 may be the same material as the base material. In this variation, the pliability of the base material 230 may be adjusted when treated with a treatment such as heat treatment or ultraviolet treatment. For example, the polymer chains of a polymer based base material 230 may cross link when exposed to ultraviolet light, thus decreasing the pliability of the cross linked portions of the base material 230. To obtain the effect of a first portion 210 with less pliability and a second portion 220 with higher pliability, during production a mask may be placed over the second portion 220 prior to an ultraviolet treatment. As a result, the regions without the mask will become first portions 210 with lower pliability and the regions with the mask will remain relatively more pliable. After the ultraviolet treatment, the base material 230 may be coated to prevent further cross-linking of the polymer chains when exposed to ultraviolet light. However, any other suitable method may be used to adjust the pliability of particular portions of a base material 230 with adjustable pliability.

Figure 20:
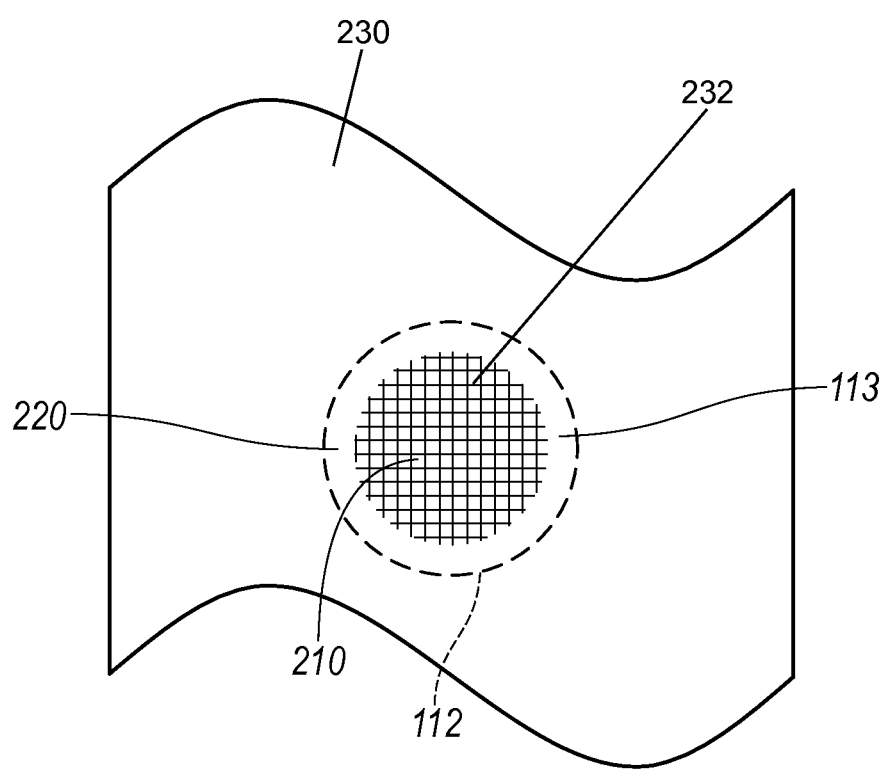

The modifier material 232 may be of a material substantially similar to the base material 230 (e.g., a polymer of a second type embedded into a polymer of a first type) or may alternatively be of a material substantially dissimilar from the base material 230 (e.g., a metallic material embedded into a polymer material). In the variation of the modifier material 232 that includes a secondary material and a tertiary material, the secondary and tertiary materials may be of a material substantially similar or identical to each other and/or the base material. Alternatively, the secondary, tertiary, and base materials may be of substantially different types of materials. The modifier material 232 may be arranged into a variety of patterns and/or geometries, such as a lattice structure (as shown in FIG. 20), a plate structure, a plurality of strips, a ring structure, a plurality of concentric rings, a hexagonal structure, a rectangular structure, or any other suitable structure to control the shape of the deformation of the particular surface 113. A plurality of modifier material 232 may also be embedded at different levels within the thickness of the layer 110. The embedded modifier material 232 preferably functions to decrease the overall pliability of the first portion 210, allowing the first portion 210 to effectively act as a material with lower pliability than the second portion 220, substantially biasing the particular region 113 to deform at a higher degree in the second portion 220 than at the first portion 210. Alternatively, the embedded modifier material 232 may function to increase the overall pliability of the second portion 220.

The modifier material 232 is preferably embedded into the first portion 210 or the second portion 220 during the manufacturing process of the layer 110. Preferably, the modifier material 232 may be placed within a mold for the layer 110 and embedded into the layer 110 at the first portion 210 during the molding process. Alternatively, the layer 110 may be manufactured using a layering process wherein thin-layers are stacked. During the stacking process of the thin-layers, the modifier material 232 may be placed in the first portion 210 and embedded into the layer 110 during the thin-layer stacking process. In a variation of the thin-layer stacking process, the layer 110 may consist of at least two thin-layers wherein the thin-layers are each manufactured independently and then assembled with the modifier material 232 placed in between the thin-layers in a suitable arrangement. The thin-layers may then be attached or bonded using adhesive, heat treatment, ultra-sonic bonding, oxygen plasma surface treatment, or any other techniques known to one skilled in the art. Alternatively, the modifier material 232 may be formed into the suitable arrangement and then inserted in between two layers of base material. The pre-formed modifier material 232 may then be bonded or attached to the base material. The modifier material 232 may alternatively be embedded into the first portion 210 after the layer 110 has been made. For example, the layer 110 may be molded to define a niche in the first portion 210. The modifier material 232 is then assembled into the niche and sealed with a sealing material that is preferably substantially similar to the base material 230 (for example, a plug made of the base material 230 that is bonded to the layer 110) but may alternatively be of a sealing material substantially dissimilar from the base material 230 (for example, an adhesive or a sealant). The layer 110 may also be molded as a continuous layer, wherein a post-manufacturing process creates a niche at the first portion 210 of the layer 110, allowing the modifier material 232 to be assembled into the niche through a process similar to that mentioned above. In the variation where the modifier material 232 chemically reacts with the base material, the assembled modifier material 232 and base material 230 of the layer 110 may be put through a heat treatment, an ultraviolet treatment, or any other suitable treatment to activate the chemical reaction between the modifier material 232 and the base material. However, any other suitable method and/or process suitable to embedding a secondary material into the first portion 210 of the layer 110 may be used.

4. Tactile Layer

As shown in FIGS. 21a-24d, the tactile layer 110 of the preferred system 100 functions to provide tactile guidance to a user through a deformable region 113 that is tactilely distinguishable from an undeformable region, at the tactile surface 115 of the tactile layer 110, in at least one of the retracted and expanded settings.

Figure 24A:
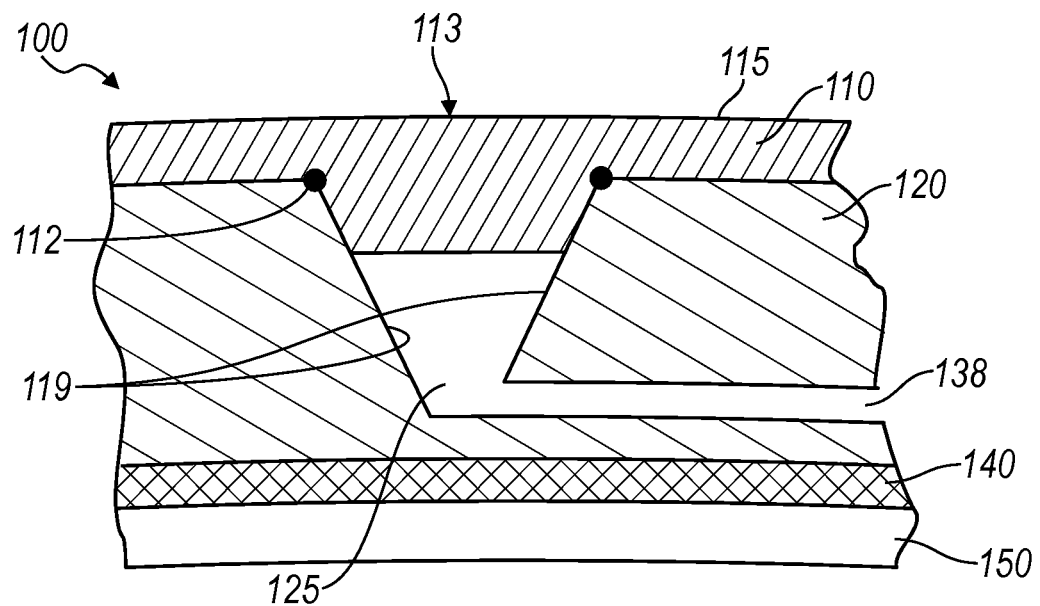
FIGS. 24a and 24b are elevation views of one variation of the preferred system.
Figure 24B:
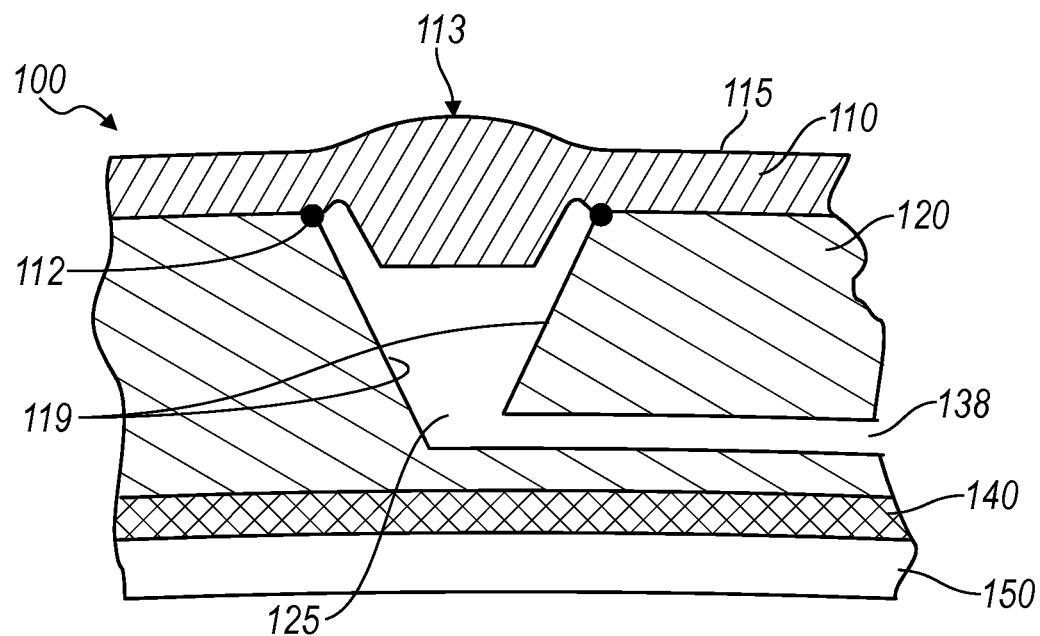
Figure 25A:
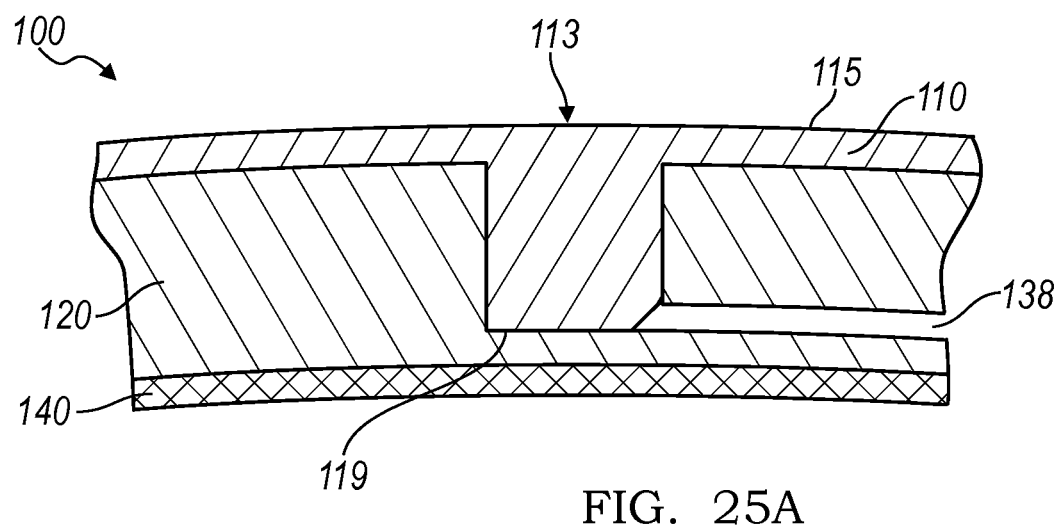
FIGS. 25a and 25b are elevation views of one variation of the preferred system.
Figure 25B:
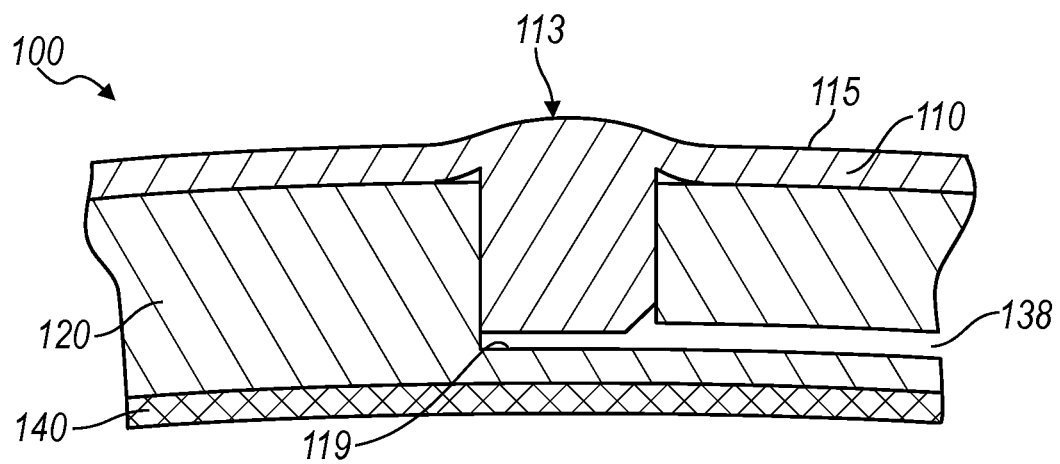

The tactile layer 110 may be of any form and any thickness across the deformable region 113 and the undeformable region. In one variation of the preferred system 100, the undeformable region of the tactile layer 110 is substantially uniform in thickness, and a portion of the deformable region 113 is of a uniform thickness greater than the thickness of the undeformable region. In this variation and shown in FIGS. 25a and 25b, the portion of the deformable region 113 of greater thickness may substantially resist flexing as compared to a thinner portion of the deformable region 113 such that the tactile surface 115 at the deformable region 113 is substantially planar in both the retracted and expanded settings. In another variation of the preferred system 100 and as shown in FIGS. 24a and 24b, the undeformable region of the tactile layer 110 is substantially uniform in thickness, and the deformable region 113 is of a varying thickness including portions of thickness greater than the thickness of the undeformable region. In this variation, the deformable region 113 is preferably planar at the tactile surface 115 in the retracted setting and defines a greater thickness near the center of the deformable region 113 than at the perimeter of the deformable region 113 such that the tactile surface 115 of the deformable region 113 may also be substantially planar in both the retracted and expanded settings. In yet another variation, the deformable region 113 may define a "step" at a border between the deformable and undeformable regions. This step may be rectilinear or curvilinear in form, or of any other form.

In a further variation of the referred system 100 in which the substrate 120 defines a cavity 125, the deformable region 113 may extend into the cavity 125 to contact a wall of the cavity 125 in the retracted state. As shown in FIGS. 24a, 24b, 25a, and 25b, the wall of the cavity may define the support member 119, which may limit inward deformation of the deformable region 113 due to a force applied to the tactile surface 115. In this variation, the extension of the deformable region 113 into the cavity 125 may be cubic, rectilinear, hemispherical, cylindrical (shown in FIG. 25a), conical (shown in FIG. 24a), pyramidal, or of any other form. As shown in FIGS. 22a-22d, the face(s) of the extension are preferably inset from the face(s) of the cavity 125 to permit the extensions to move unobstructed within the cavity 125 as the deformable region 113 transitions between the retracted and expanded settings. Alternatively and as shown in FIGS. 24a and 24b, the extension may be tetrahedral or conical in form, wherein at least one wall of the cavity 125 is inclined at a first angle (a "draft" angle) and the extension of the deformable region 113 includes a wall of an included angle matched with the angle of the inclined wall of the cavity 125. In this example, the inclined face of the extension of the deformable region 113 preferably contacts the inclined wall of the cavity 125 in the retracted setting, wherein the wall of the cavity 125 defines the support member 119 that supports the deformable region 113 against inward deformation in the presence of a force on the tactile surface 115. However, the extension may be of any other form and the cavity may include a face of any other form matched with the extension.

In a variation of the preferred system 100 in which the deformable region 113 includes an extension into the cavity 125, the extension and/or the cavity may include a latching feature, as shown in FIGS. 22a-22d. The latching feature is preferably a mechanical construction within the tactile layer 110 and/or the substrate 120 that provides tactile feedback, such as in the form of a "click," when the deformable region 113 is depressed. In one example implementation shown in FIGS. 22a and 22b, the cavity includes a ridge and the extension of the tactile layer 110 includes a lip such that at least one of the lip and the ridge deform as the deformable region 113 is depressed into the cavity, wherein deformation of the lip and/or ridge results in a "click." In this example implementation, the geometry of the lip and ridge can latch the position of the deformable region until a second force is applied, such as by changing fluid pressure within the cavity 125 (e.g., with the displacement device 130) or by depressing the deformable region. In another example implementation shown in FIGS. 22c and 22d, the cavity includes a ridge and the extension of the tactile layer 110 includes a lip such that at least one of the lip and the ridge deform as the deformable region 113 is depressed into the cavity, wherein deformation of the lip and/or ridge results in a "click." In this example implementation, the ridge of the cavity is coupled to a bladder or second cavity, wherein displacement of fluid into or out of (or increase or decrease is fluid pressure in) the bladder or second cavity moves the lip into and out of the cavity, respectively, to adjust interference between the lip and the ridge. Generally in this example implementation, the ridge can be moved toward the lip to yield a firmer click, and the ridge can be moved away from the lip to yield a softer click or to unlatch the deformable region 113. In this example implementation, the cavity 125 can include one or more ridges coupled to one or more bladders or second cavities, and the one or more bladders or second cavities can be coupled to the displacement device 130, can be coupled to an independent displacement device, and/or can be controlled by any number of valves. In yet another example implementation shown in FIGS. 23a-23c, the extension of the deformable region 113 includes a piston that engages a cylinder in the cavity 125. The extension further includes a lip and the cavity 125 further includes a ridge, as described above. In this example implementation, the cavity 125 and cylinder are filled with the fluid, and as the deformable region is depressed from a first position to a second position, fluid is trapped in the cylinder and compressed by the piston. Once released, the deformable region 113 returns to the first position as the compressed fluid in the cylinder acts as a return spring. Because the lip and/or ridge preferably deform to generate a "click" when the deformable region is depressed from the first position to the second position, and because the lip and/or ridge preferably deform to generate a second "click" when the deformable region returns to the first position, the example implementation can yield tactile feedback that is a double click. Furthermore, the piston and cylinder of this example implementation can also be applied to any of the foregoing example implementations or variations. However, the tactile layer 110, substrate 120, and/or any other elements of the preferred system 100 can include any other feature or geometry to provide tactile feedback to a user when the deformable region 113 is depressed.

In another variation of the preferred system 100 in which the deformable region 113 is not of uniform thickness, the attachment surface may extend into the cavity 125, wherein the deformable region 113 is coupled to the attachment surface at one or more locations within the cavity 125, as shown in FIGS. 9a and 9b. However, the deformable and undeformable regions may be of any other form and interface with the cavity 125 and/or support member 119 in any other way; the support member 119 may also be of any other form and operate in any other way to limit inward deformation of the deformable region 113 due to a force applied to the tactile surface 115.

In still another variation of the preferred system 100, the tactile layer 110 includes a recess, opposite the tactile surface 115, that substantially defines the fluid channel. The tactile layer 110 is preferably coupled to the substrate 120 that is uniform (e.g., continuous) across a face adjacent the tactile layer 110. In this variation, the fluid channel can be enclosed by substrate 120, and the substrate 120 can be physically coextensive with any other the display or touch sensor, which can yield the benefit of reducing the component count of the preferred user interface 100. In this variation, the tactile layer 110 is preferably selectively bonded to the substrate 120, wherein a bonded region of the tactile layer 110 defines the undeformable region and a region not bonded to the substrate 120 define the deformable region. However, the tactile layer 110, substrate 120, and fluid channel can be of any other form or geometry.

As a person skilled in the art of will recognize from the previous detailed description and from the figures and claims, modifications and changes can be made to the preferred embodiments of the invention without departing from the scope of this invention defined in the following claims.

We claim:
1. A user interface comprising:
a substrate defining a cavity and a fluid channel fluidly coupled to the cavity;
a tactile layer comprising a first region and a deformable region adjacent the first region, the first region coupled to the substrate, the deformable region adjacent the cavity, a first portion of the deformable region adjacent the first region, a second portion of the deformable region adjacent the first portion of the deformable region and coincident a center of the deformable region, the tactile layer defining a tactile surface across the deformable region and the first region and opposite the substrate, the first region exhibiting a first flexibility, and the second region exhibiting a second flexibility greater than the first flexibility across the tactile surface, wherein the tactile layer at the deformable region defines a second thickness greater than the first thickness across the first region; and a displacement device displacing fluid through the fluid channel and into the cavity to transition the deformable region from a retracted setting to an expanded setting, the deformable region substantially flush with the first region in the retracted setting and defining a tactilely distinguishable formation offset above the first region in the expanded setting.

2. The user interface of claim 1, wherein the first portion surrounds the second portion, the second portion substantially planar and flush with the first region in the retracted setting and offset above and parallel the first region in the expanded setting, the first portion coupling the second portion to the first region, the tactile surface continuous across the first region an the first portion and the second portion of the deformable region.

3. The user interface of claim 1, wherein the cavity comprises a first drafted wall defining a particular draft angle; wherein the deformable region comprises an extension extending into the cavity at the particular draft angle; and wherein the displacement device transitions the deformable region from the retracted setting to the expanded setting, a second drafted wall contacting the first drafted wall in the retracted setting and the second drafted wall elevated off of the first drafted wall in the expanded setting, the first drafted wall supporting the second drafted wall to support the second portion against inward deformation past flush with the first region due to a force applied to the deformable region.

4. The user interface of claim 3, wherein the substrate further defines a fluid conduit communicating fluid up the first drafted wall and toward the deformable region.

5. The user interface of claim 1, further comprising a touch sensor coupled to the substrate opposite the tactile layer and configured to detect an input on the tactile surface.

6. The user interface of claim 1, wherein, in the expanded setting, the tactile surface of the deformable region defines one of: a button, a ridge, a ring, a slider, and a pointing stick.

7. The user interface of claim 1, further comprising a reservoir coupled to the displacement device, the displacement device displacing fluid from the reservoir into the fluid channel to transition the deformable region from the retracted setting to the expanded setting and displacing fluid from the fluid channel to the reservoir to transition the deformable region from the expanded setting to the retracted setting.

8. The user interface of claim 1, wherein the sensor comprises a capacitive touch sensor outputting a signal corresponding to an input on the tactile surface.

9. The user interface of claim 1, further comprising a display coupled to the substrate opposite the tactile layer and configured to render an image through the tactile surface; wherein the substrate comprises a substantially transparent material; and wherein the tactile layer comprises a substantially transparent material.

10. The user interface of claim 9, wherein the display renders an image of a virtual keyboard, the deformable region aligned and coincident with a particular key of the virtual keyboard.

11. A user interface comprising:

a substrate defining a cavity and a fluid channel fluidly coupled to the cavity;

a tactile layer comprising a first region and a deformable region adjacent the first region, the first region coupled to the substrate, the deformable region adjacent the cavity, a first portion of the deformable region adjacent the first region, a second portion of the deformable region adjacent the first portion of the deformable region, the tactile layer defining a tactile surface across the deformable region and the first region and opposite the substrate, the first region exhibiting a first flexibility, and the second region exhibiting a second flexibility greater than the first flexibility across the tactile surface, wherein the tactile layer at the first region defines a first thickness, and wherein the tactile layer at the deformable region defines a second thickness greater than the first thickness across the first region;

a displacement device configured to displace fluid through the fluid channel and into the cavity to transition the deformable region from a retracted setting to an expanded setting, the deformable region in the expanded setting tactilely distinguishable from the deformable region in the retracted setting; and a touch sensor coupled to the substrate and configured to output a signal corresponding to an input on the tactile surface.

12. The user interface of claim 11, wherein the substrate further defines a support member adjacent the deformable region and the cavity, the support member resisting inward deformation of the deformable region past flush with the tactile layer.

13. The user interface of claim 11, wherein the first region and the second portion of the deformable region are continuous across the tactile surface, the tactile layer comprising an elastomeric material.

14. A user interface comprising:

a substrate defining a cavity and a fluid channel fluidly coupled to the cavity;

a tactile layer comprising a first region and a deformable region adjacent the first region, the first region coupled to the substrate, the deformable region adjacent the cavity, a first portion of the deformable region adjacent the first region, a second portion of the deformable region adjacent the first portion of the deformable region, the tactile layer defining a tactile surface across the deformable region and the first region and opposite the substrate, the first region exhibiting a first flexibility, and the second region exhibiting a second flexibility greater than the first flexibility across the tactile surface wherein the second portion of the deformable region defines a conical extension extending into the cavity;

a displacement device configured to displace fluid through the fluid channel and into the cavity to transition the deformable region from a retracted setting to an expanded setting, the deformable region in the expanded setting tactilely distinguishable from the deformable region in the retracted setting; and a touch sensor coupled to the substrate and configured to output a signal corresponding to an input on the tactile surface.

* * * * *